(12) United States Patent  
Kadono

(10) Patent No.: US 6,487,315 B2
(45) Date of Patent: Nov. 26, 2002

(54) IMAGE DECODING APPARATUS USING PIXEL VALUES FROM AT LEAST THREE REFERENCE PIXELS

(75) Inventor: Shinya Kadono, Kobe (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/867,610

(22) Filed: May 31, 2001

(65) Prior Publication Data

US 2001/0024526 A1 Sep. 27, 2001

Related U.S. Application Data

(63) Continuation of application No. 09/651,120, filed on Aug. 30, 2000, which is a continuation of application No. 09/077,378, filed on Jul. 20, 1998, now Pat. No. 6,173,078.

(30) Foreign Application Priority Data

Oct. 30, 1996 (JP) .............................................. 8-287858

(51) Int. Cl.[7] .................................................. G06K 9/36
(52) U.S. Cl. .......................... 382/238; 382/247; 382/239
(58) Field of Search ................................. 382/232, 238, 382/239, 243, 247, 244, 251, 268, 275, 248, 229; 341/107, 51; 358/261.2, 261.1, 426

(56) References Cited

U.S. PATENT DOCUMENTS

| | | | |
|---|---|---|---|
| 4,947,249 A | 8/1990 | Kondo | ........................ 358/135 |
| 5,007,102 A | 4/1991 | Haskell | ........................ 382/238 |
| 5,524,067 A | 6/1996 | Miyake et al. | ............... 382/238 |
| 5,745,603 A | 4/1998 | Rust | ............................ 382/247 |
| 5,905,819 A | 5/1999 | Daly | ............................ 382/232 |

FOREIGN PATENT DOCUMENTS

| | | | |
|---|---|---|---|
| EP | 0 720 379 | 7/1996 | ............ H04N/7/26 |
| JP | 62-122479 | 6/1987 | ............ H04N/7/13 |
| JP | 1-205663 | 8/1989 | .......... H04N/1/413 |
| JP | 2-105790 | 4/1990 | ............ H04N/7/13 |
| JP | 4-219074 | 8/1992 | ............ H04N/1/41 |
| JP | 6-78294 | 3/1994 | .......... H04N/7/137 |

OTHER PUBLICATIONS

Brady et al., "Context–based Arithmetic Encoding of 2D Shape Sequences" Oct. 26, 1997, pp. 29–32.

Ad Hoc Group on MPEG–4 Video VM Editing, "MPEG–4 Video Verification Model Version 7.0Encoder Definition" Apr. 1, 1997, pp. 17–122.

*Primary Examiner*—Wenpeng Chen
(74) *Attorney, Agent, or Firm*—Parkhurst & Wendel, L.L.P.

(57) ABSTRACT

Apparatus for decoding, block by block, image block of N×N pixels, in coded image signal form obtained by successfully coding pixel values of plural peripheral pixels in the vicinity of a coding target pixel, the apparatus including a device for replacing a pixel value of an undecoded pixel among three lines of nearby peripheral pixels with a pseudo pixel value obtained from a decoded peripheral pixel located closest to and on the same line as the uncoded pixel; a prediction value generator for generating a prediction pixel value for the target pixel from the value of the decoded pixel and the replacement pixel value of the undecoded pixel; a decoder for (a) receiving the coded image signal, (b) performing a decoding process using the pixel values of at least one decoded pixel in each of a previously decoded block, the decoding target block, and a pseudo pixel value of an undecoded pixel, and (c) outputting a decoded image signal for each block; and an inverse blocking unit for combining decoded image signals corresponding to the blocks.

2 Claims, 16 Drawing Sheets

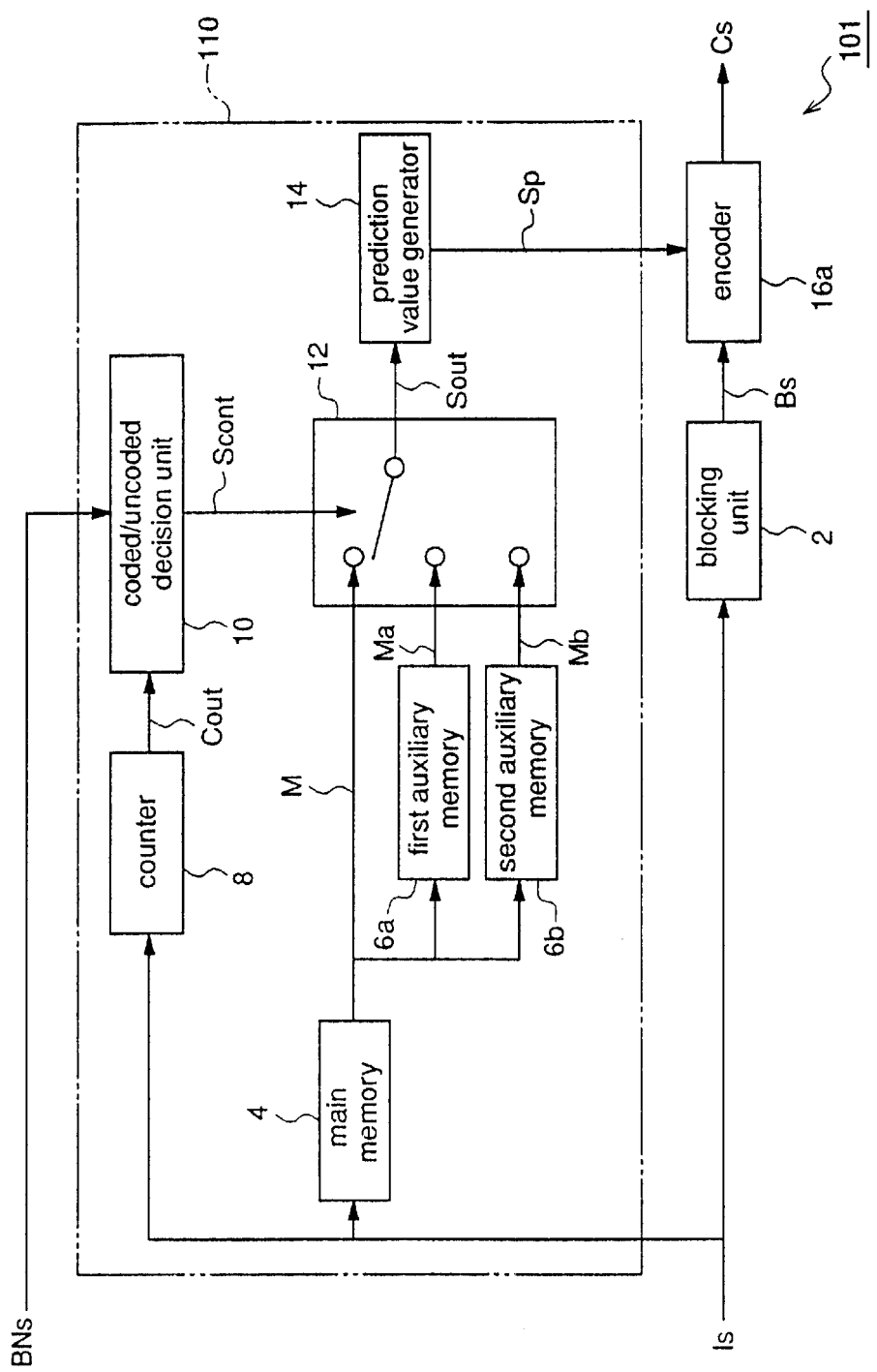
Fig.1

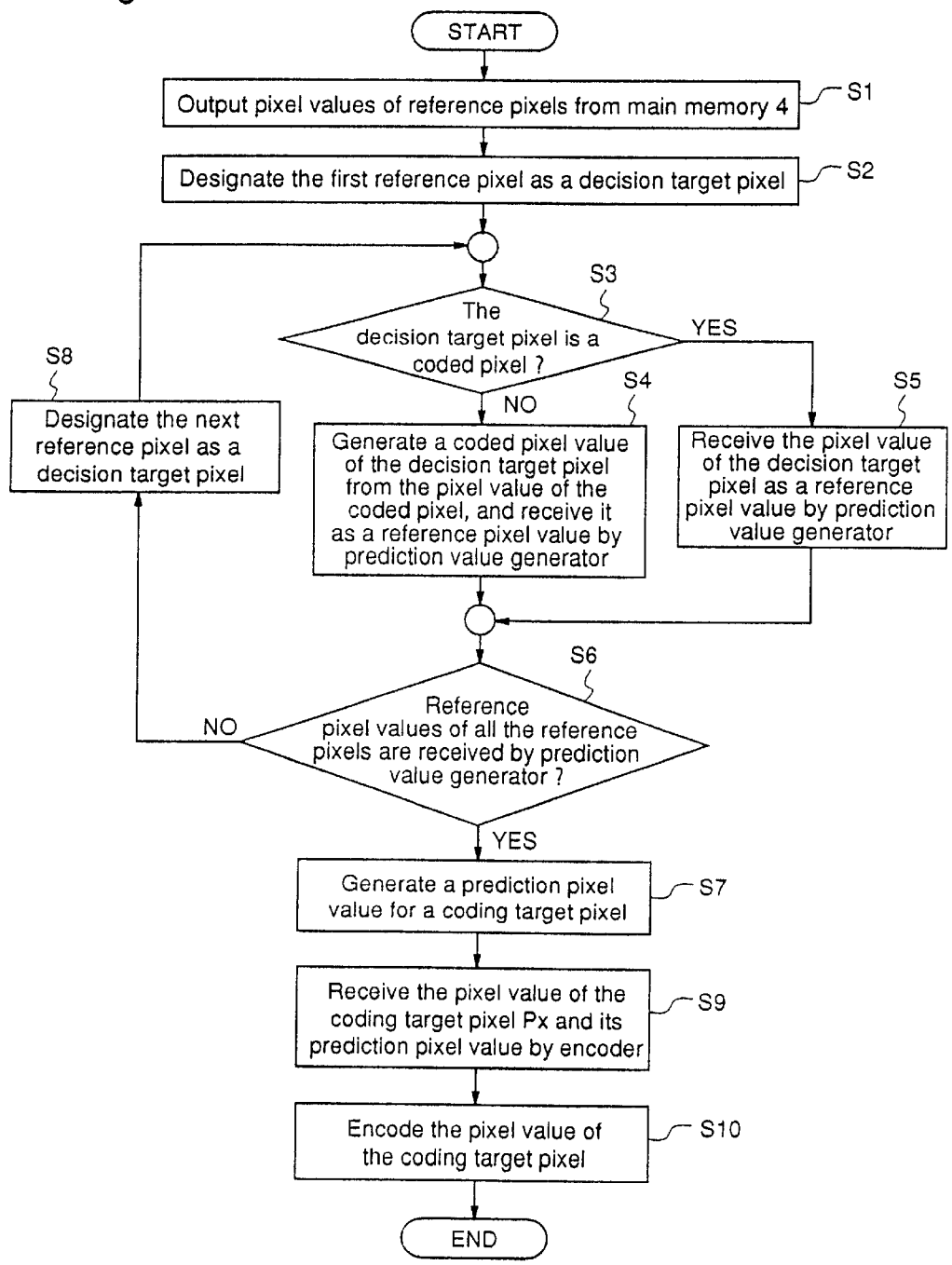

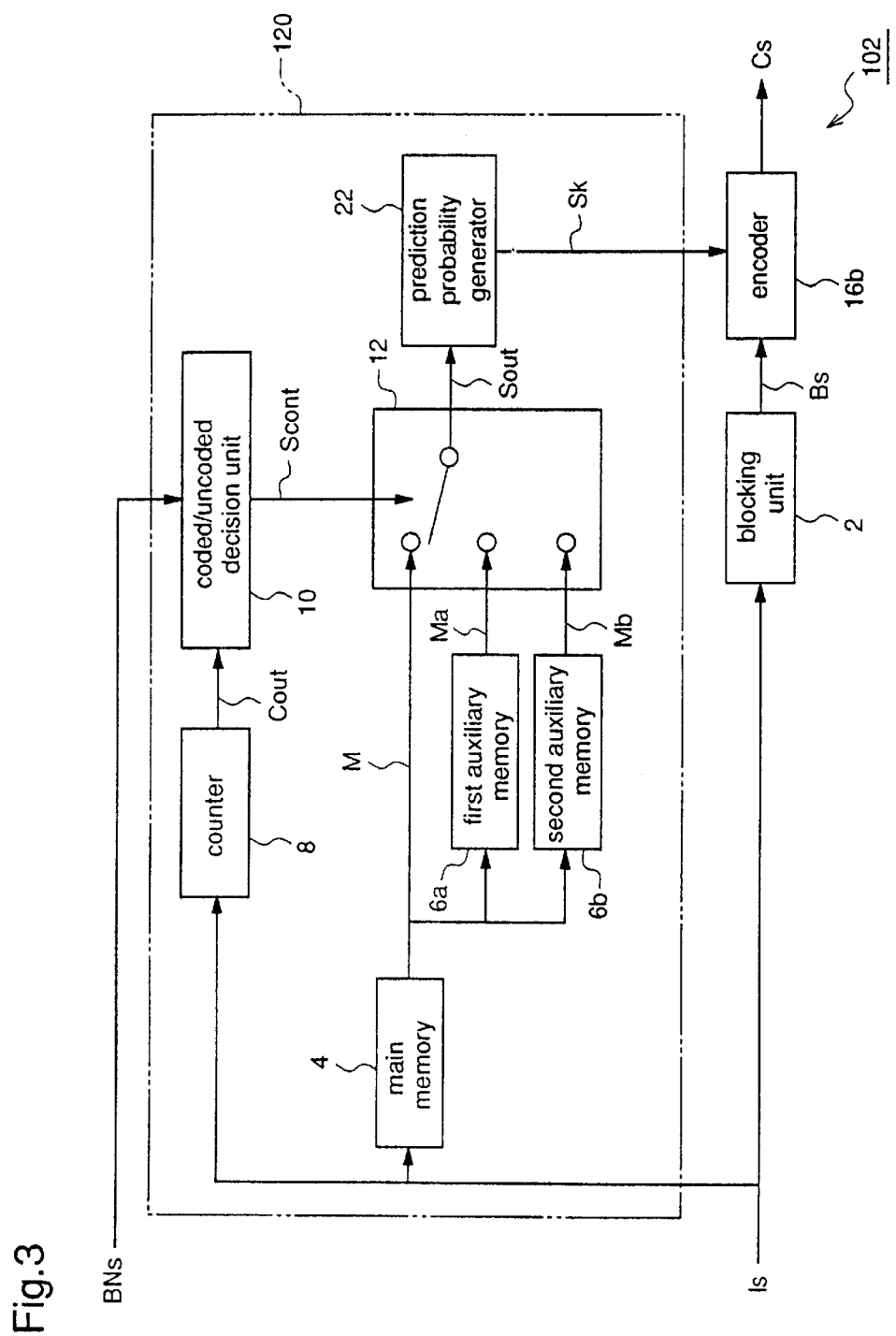
Fig.3

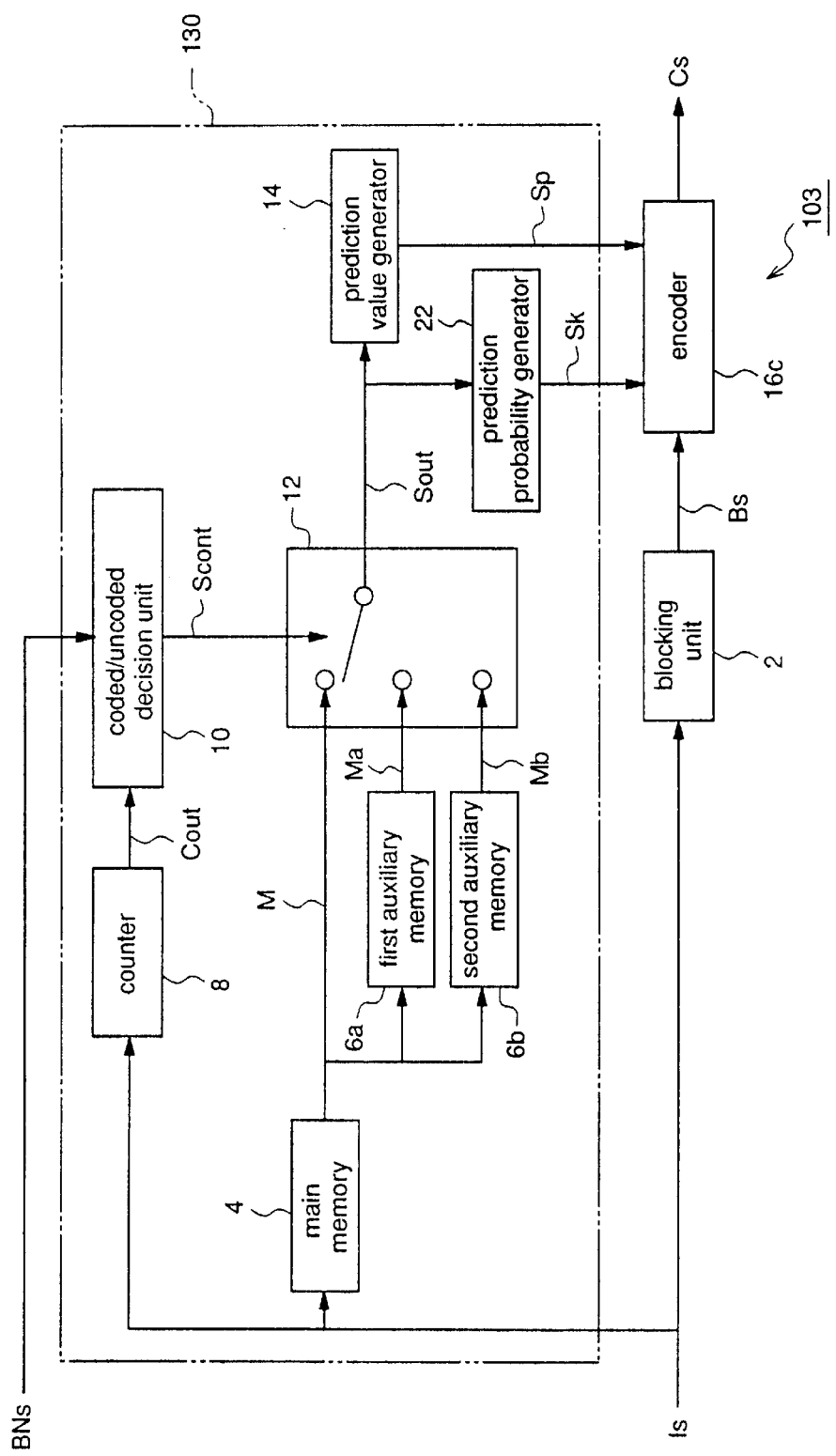
Fig.4

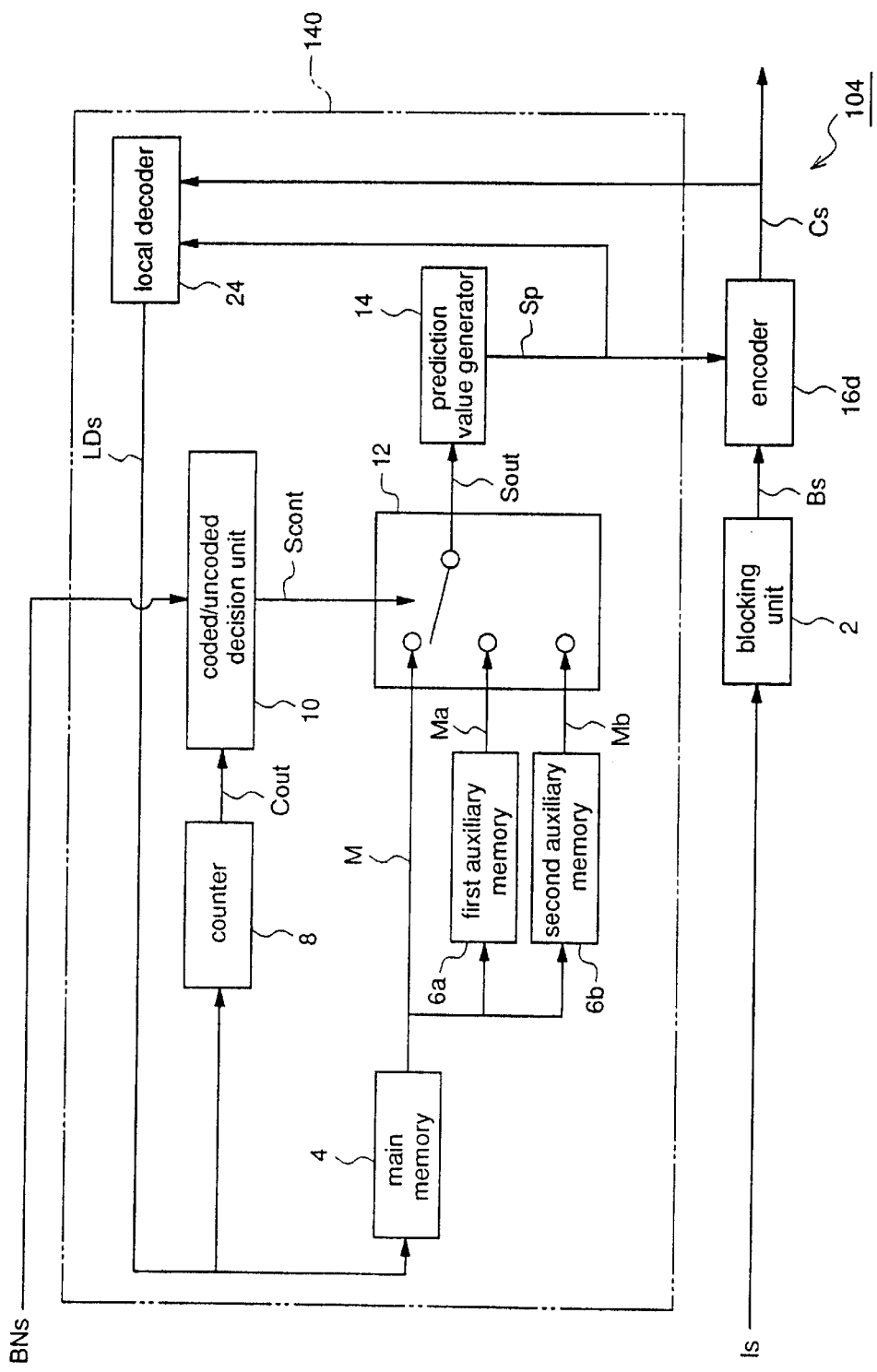
Fig.5

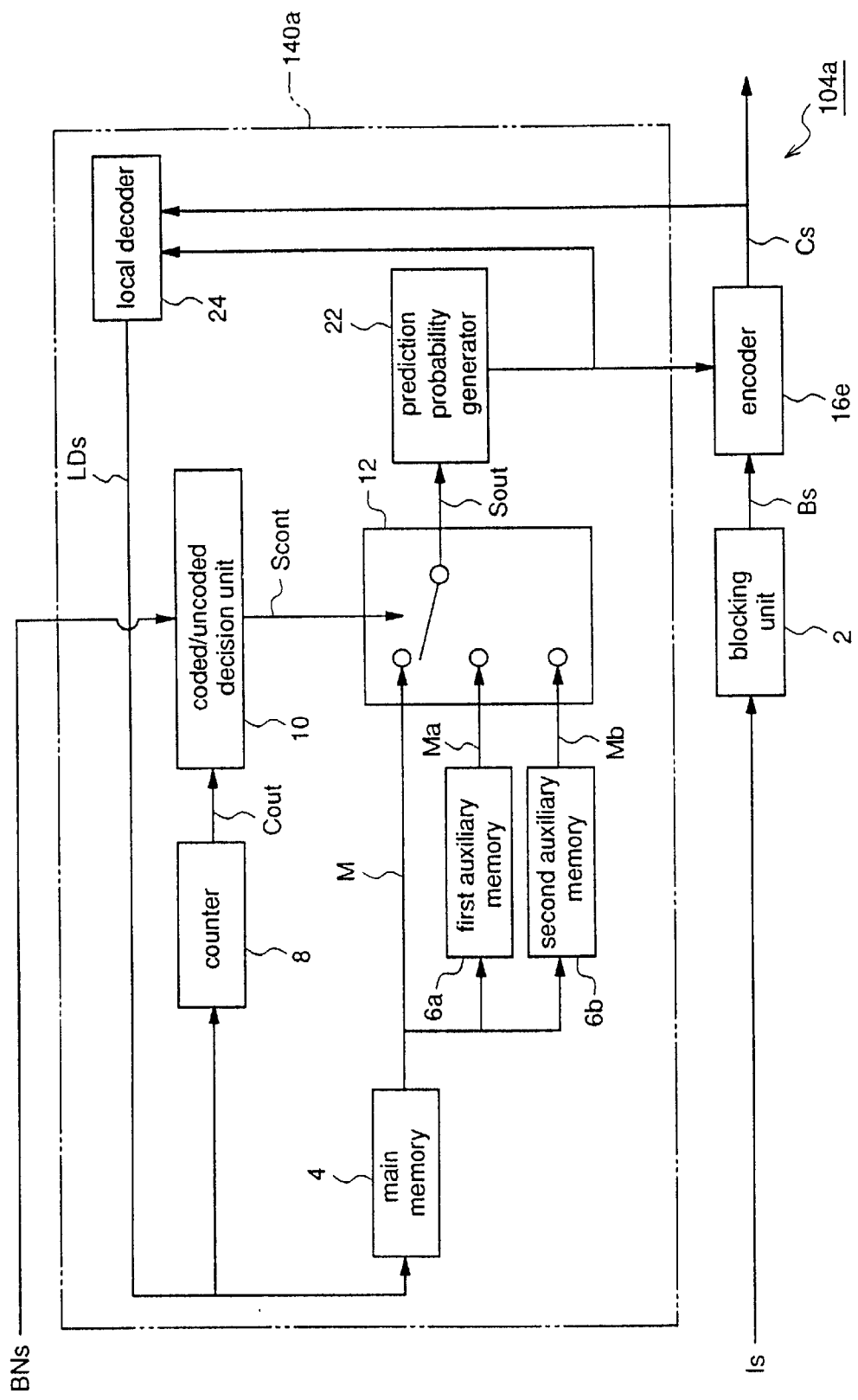
Fig.6

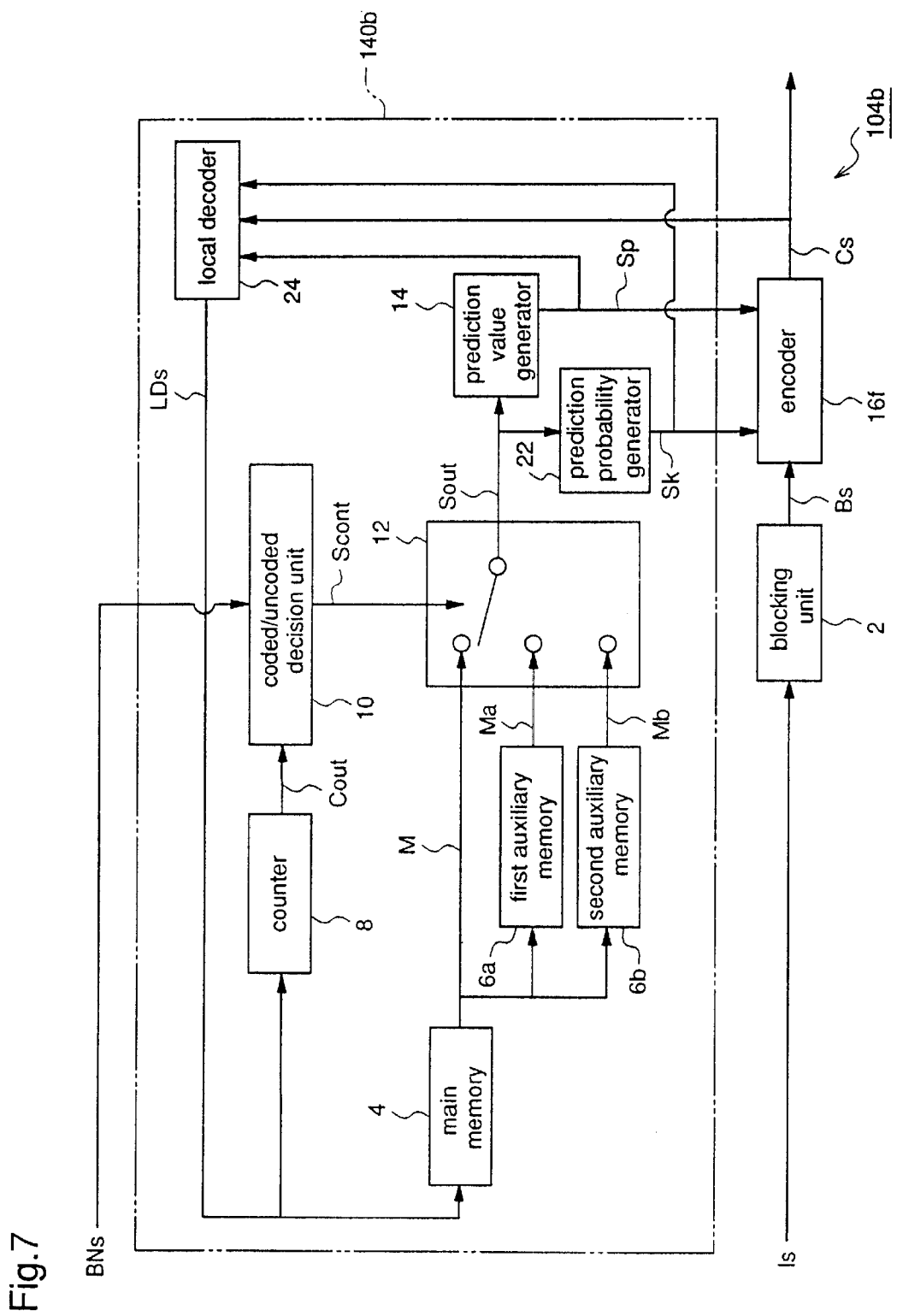
Fig.7

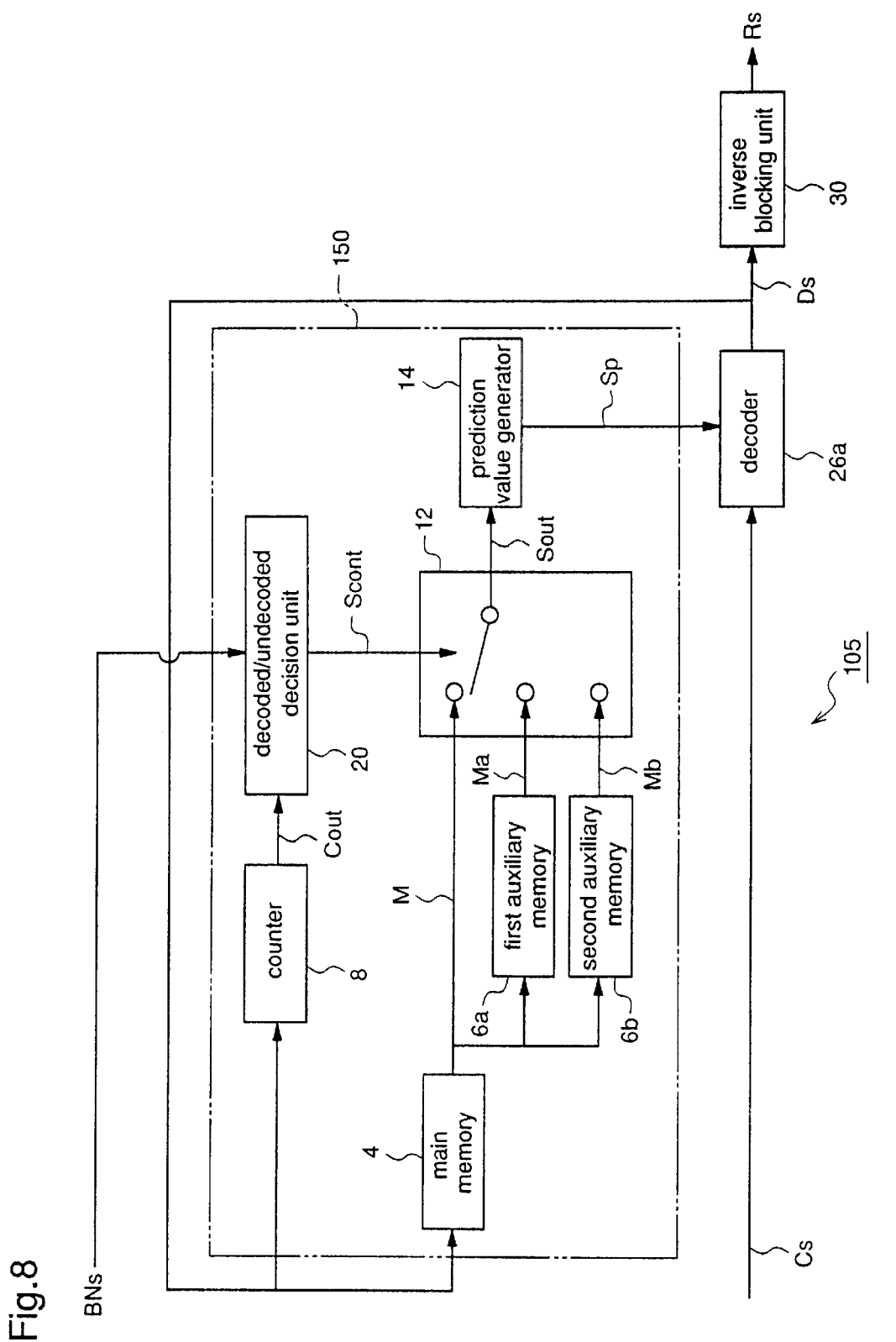
Fig.8

Fig.9
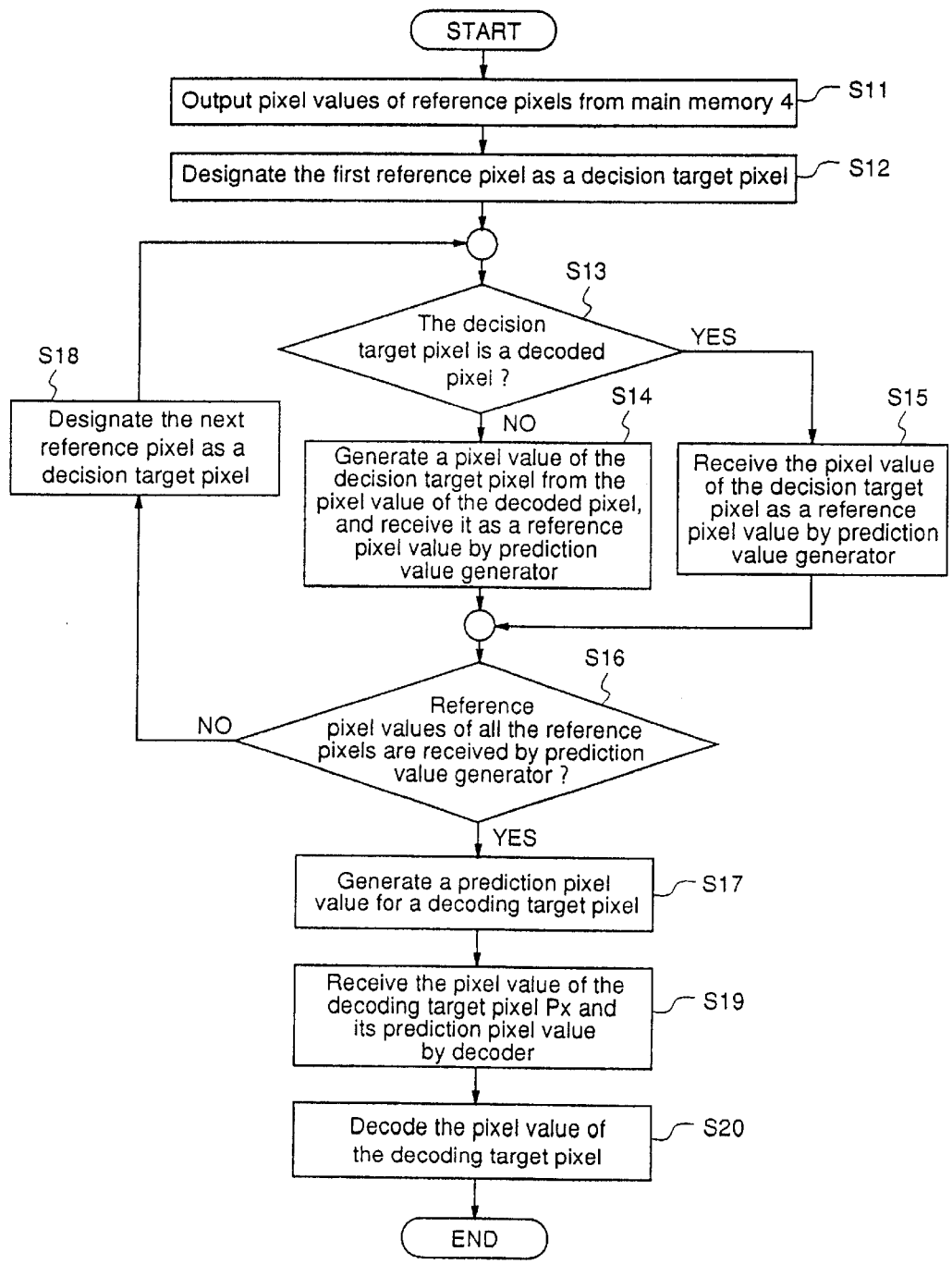

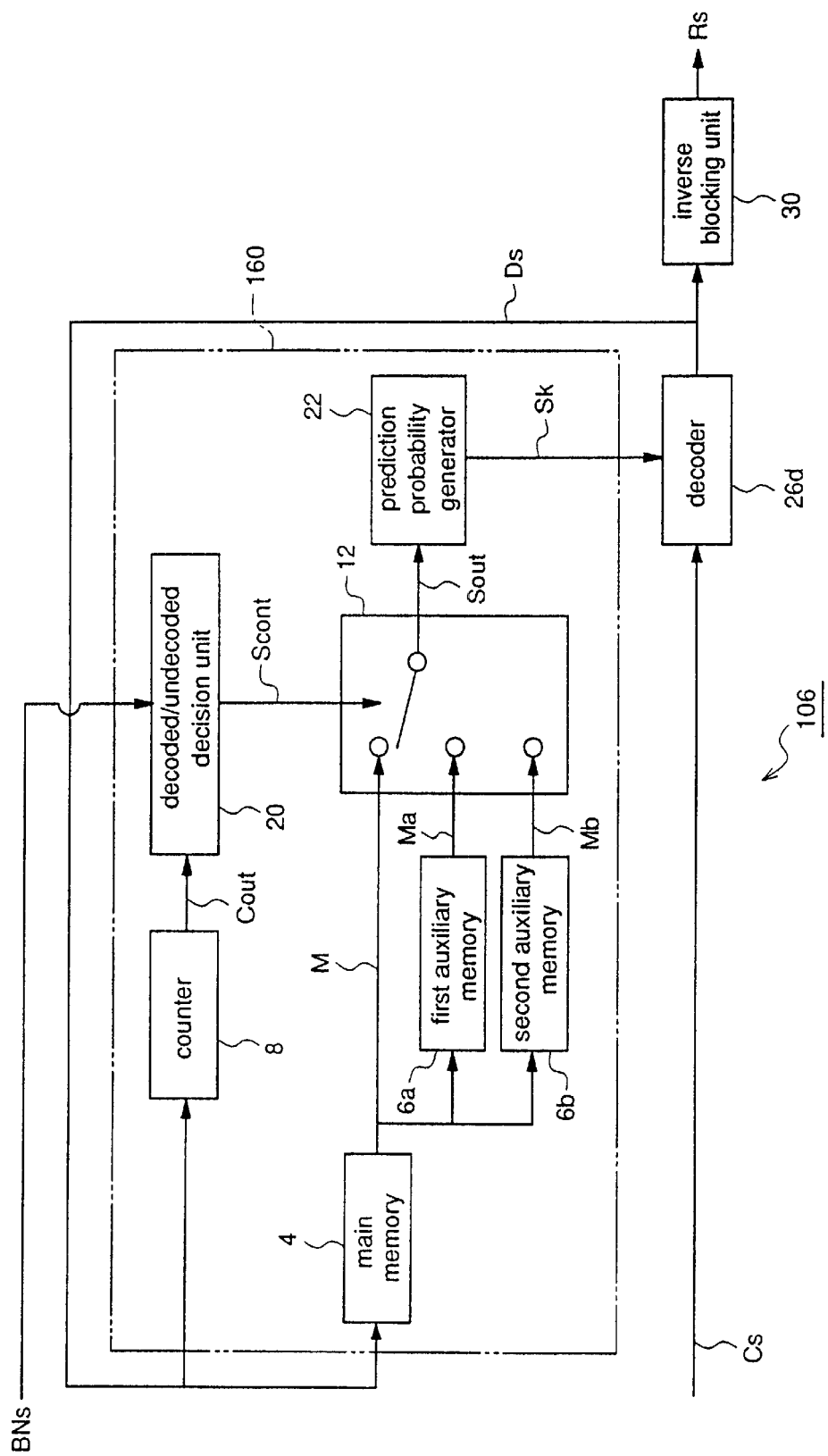
Fig.10

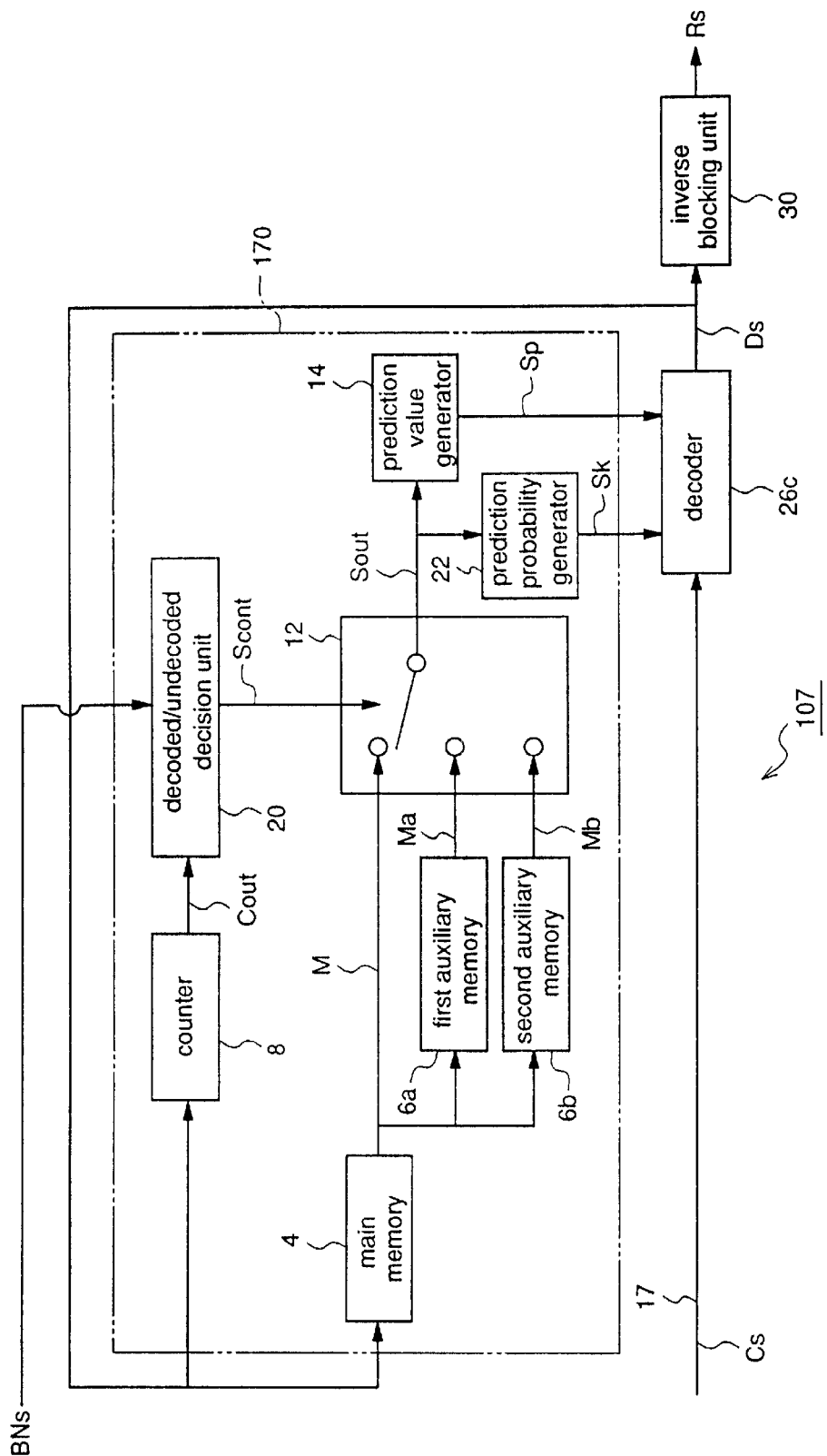
Fig.11

Fig.12 (a)
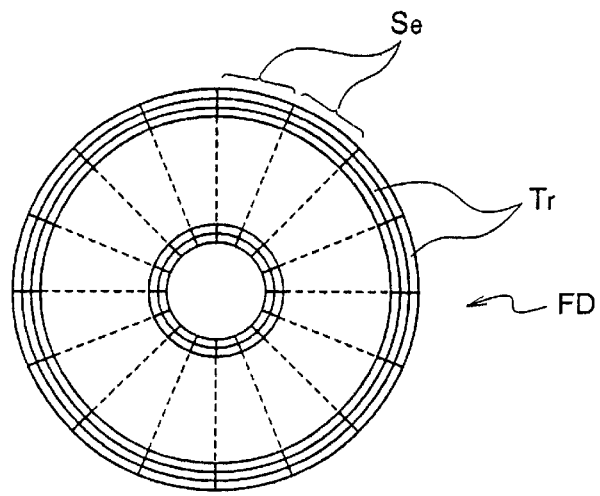
Fig.12 (b)
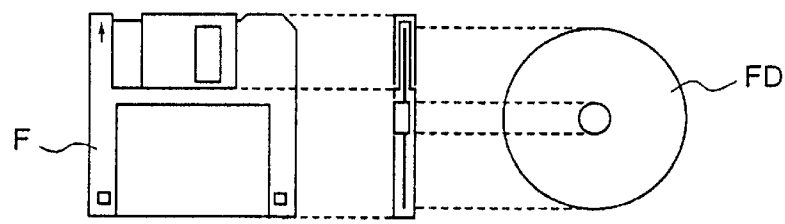
Fig.12 (c)
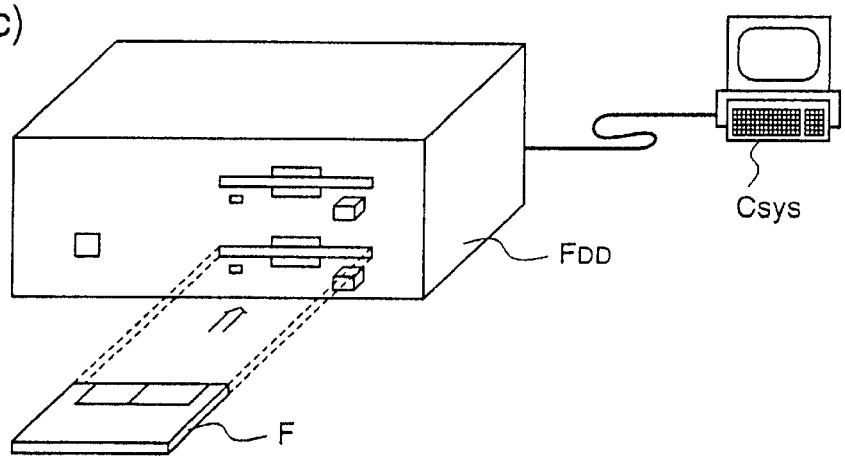

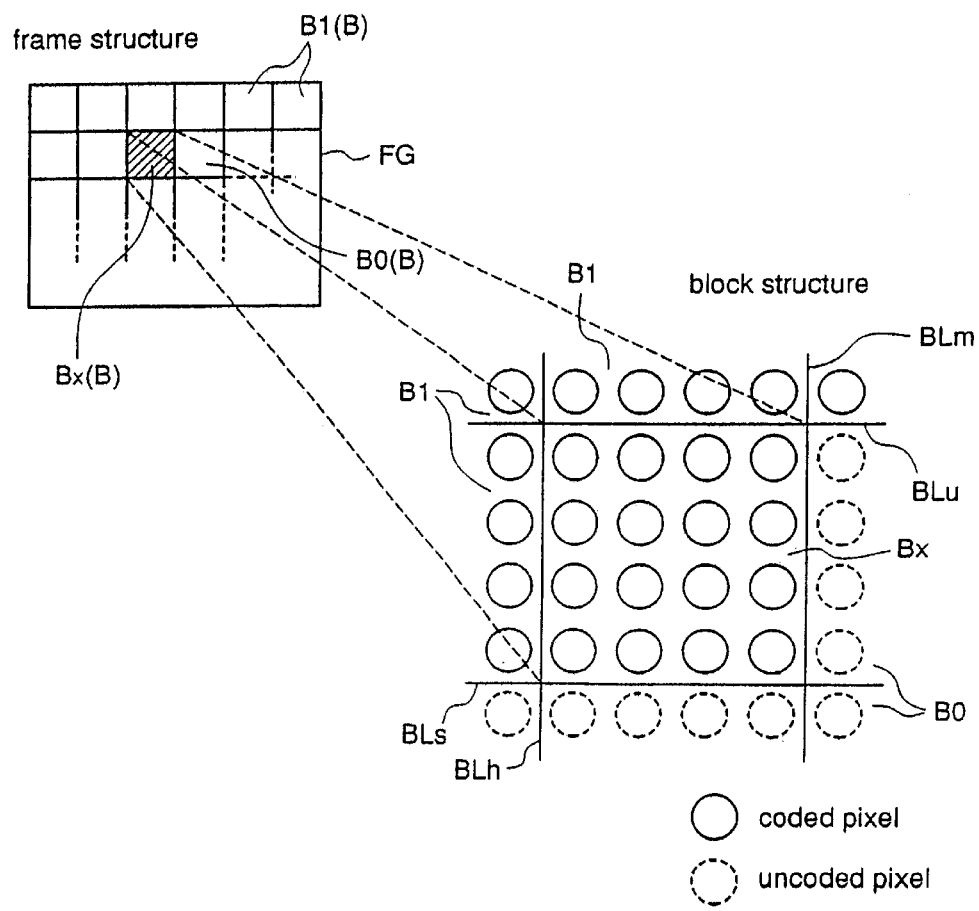
PRIOR ART
Fig.13 (a)
PRIOR ART
Fig.13 (b)

Fig.14
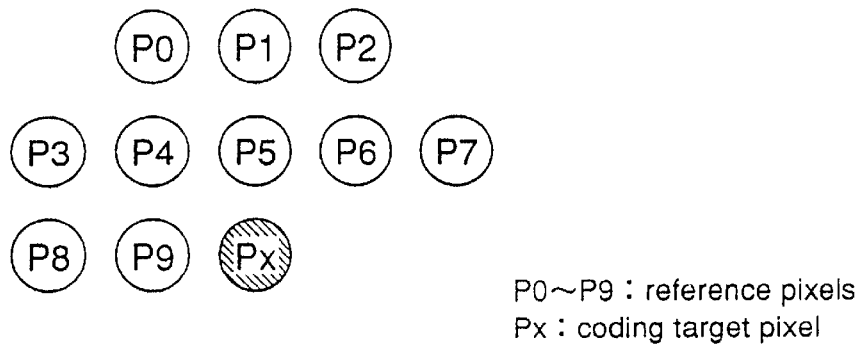
P0~P9 : reference pixels
Px : coding target pixel
Fig.15
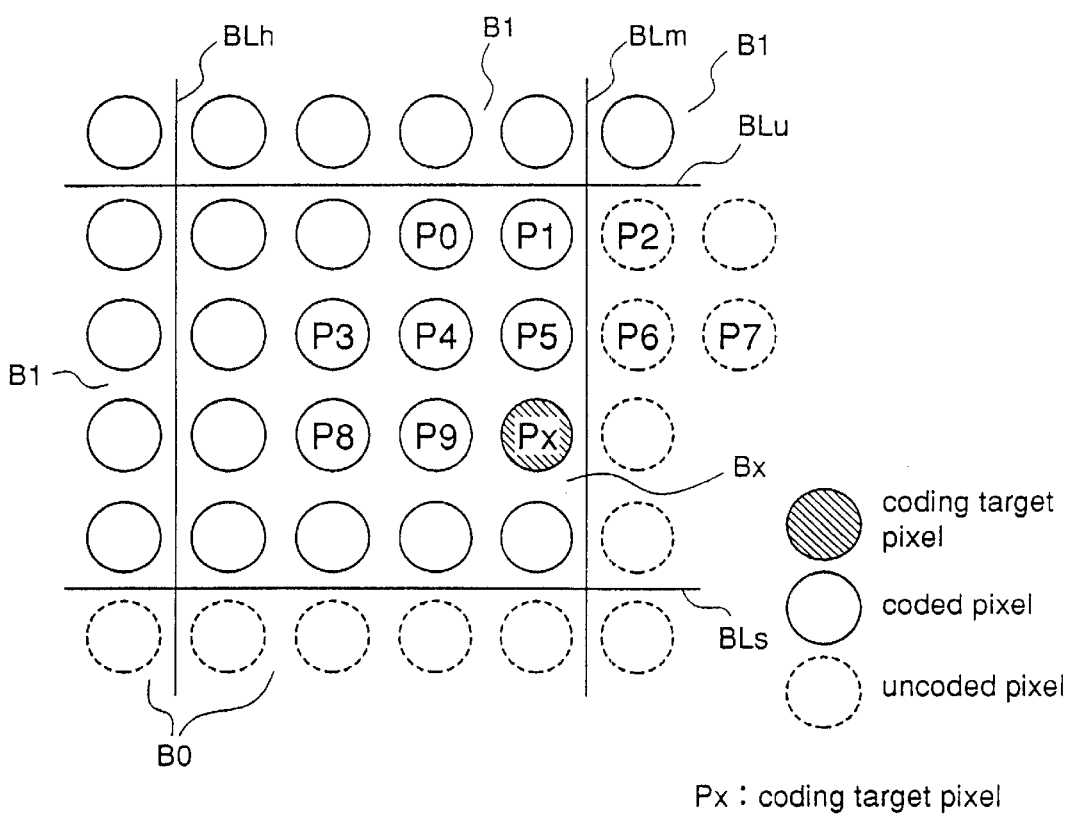
Px : coding target pixel

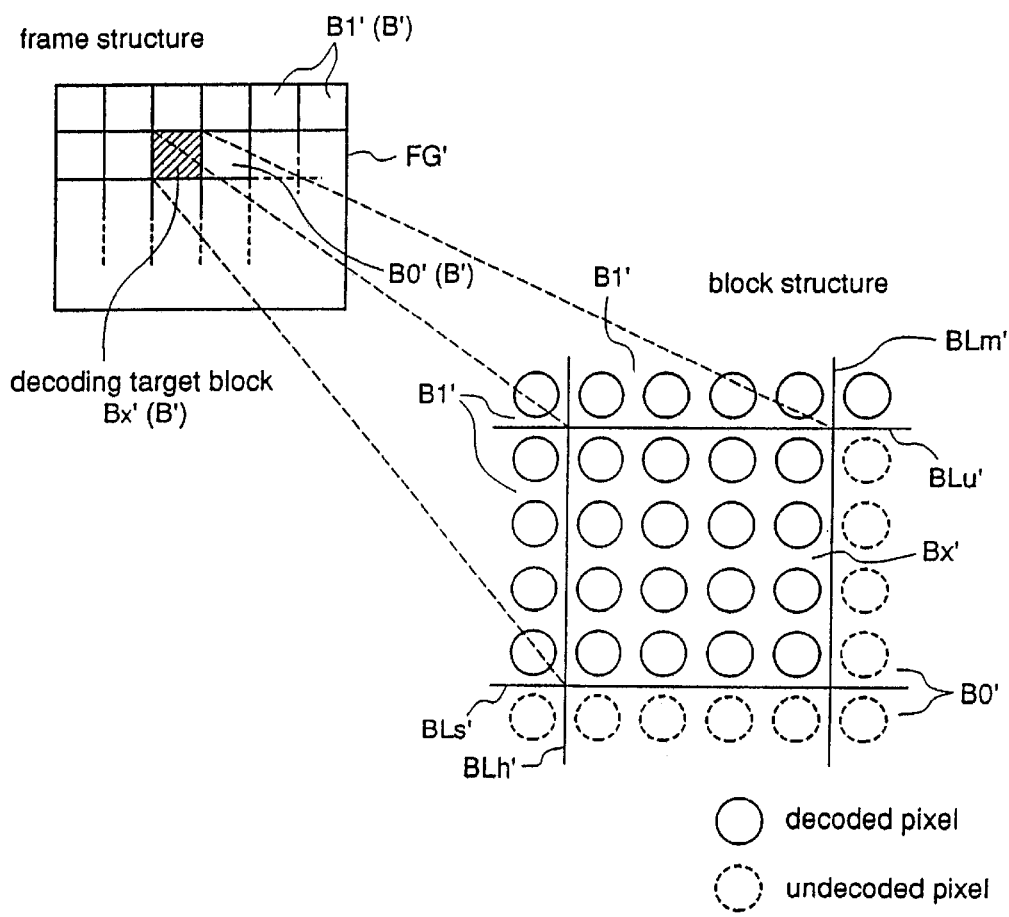

Fig.17
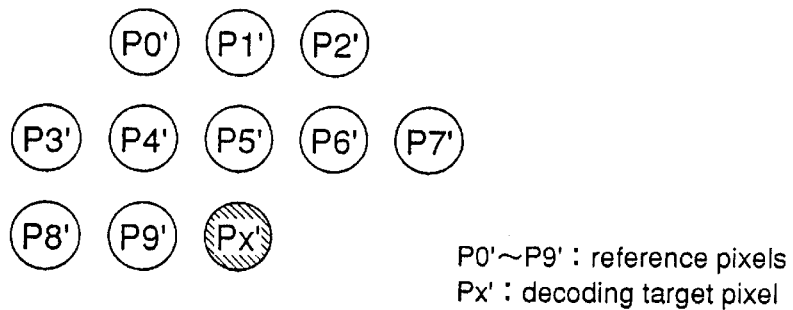
P0'~P9' : reference pixels
Px' : decoding target pixel
Fig.18
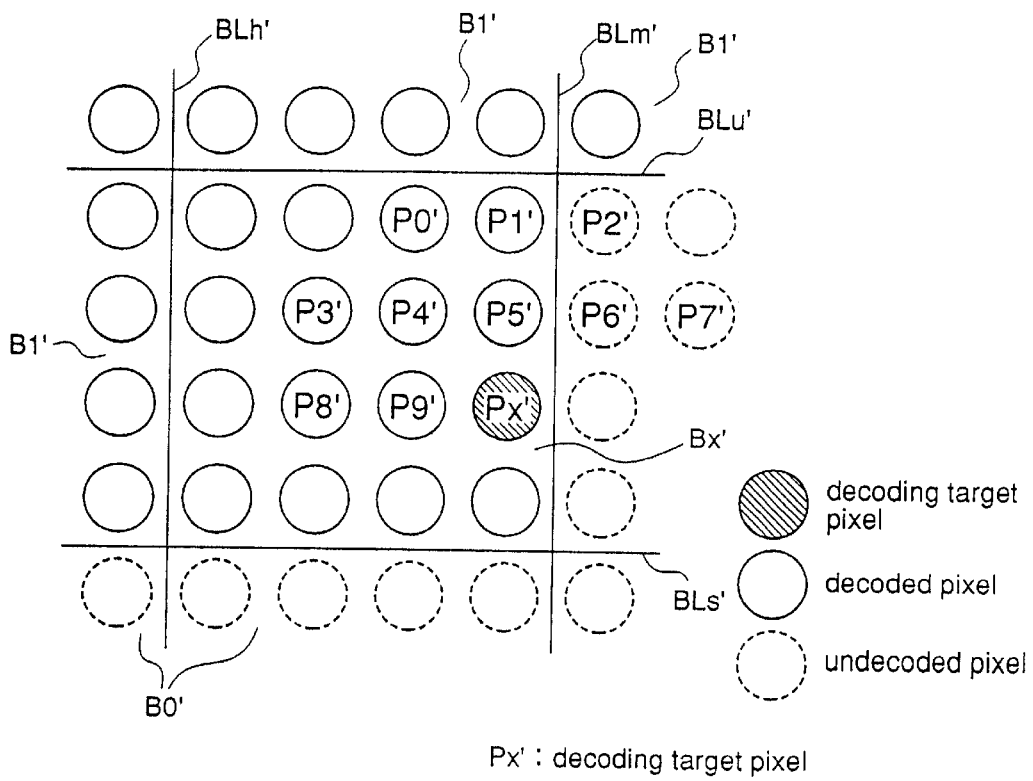
Px' : decoding target pixel

IMAGE DECODING APPARATUS USING PIXEL VALUES FROM AT LEAST THREE REFERENCE PIXELS

This is a Continuation of application Ser. No. 09/651,120 filed Aug. 30, 2000 which in turn is a Continuation of application Ser. No. 09/077,378, filed Jul. 20, 1998, now U.S. Pat. No. 6,173,078.

TECHNICAL FIELD

The present invention relates to image coding apparatuses and image coding methods, image decoding apparatuses and image decoding methods, and data recording media and, more particularly, to a coding process and a decoding process for performing recording or transmission of image signals with less bit number without degrading the image quality, and to a recording medium containing a program for realizing the coding process or the decoding process.

BACKGROUND ART

Conventional image coding processes are broadly divided into two of coding processes performed in block units, represented by MPEG2-based coding methods, and coding processes performed in pixel units, such as differential pulse code modulation (DPCM: Differential Pulse Code Modulation).

The coding process in block units is a method in which a single image display region is divided into plural blocks and a coding process for an image signal that is input (hereinafter referred to as an input image signal) is performed block by block. In this case, the single image display region corresponds to a single display screen in the MPEG2-based coding process, and in an MPEG4-based coding process, it corresponds to a display region having a shape and a size corresponding to each object on a single display screen. Further, each of the above-mentioned blocks is a display region composed of a prescribed number of pixels within the single image display region, and a rectangle shape which is easily processed is used as the shape of the block in many cases.

As described above, in the coding method in which a coding process for an input image signal is performed block by block, the coding process for the input image signal corresponding to a single image display region is completed in each block. Therefore, there is the advantage that, even though a transmission error occurs when a coded image signal obtained by performing the coding process for the input image signal is transmitted, influence of the error can be converged in each block.

However, the block-by-block coding method has the following drawbacks.

Since the coding process for the input image signal is completed in each block in the block-by-block coding method, it is difficult to use an inter-block pixel correlation, that is, a correlation of pixel values which are present in different blocks, in the coding process.

Further, in a predictive coding method for an image signal, a pixel value of a coding target pixel being a target of coding (a coding target pixel value) is predicted with reference to pixel values of plural coded pixels which have previously been coded (coded pixel values), and the coding target pixel value is adaptively coded using the predicted pixel value. In this predictive coding method, however, when the coding process is performed block by block, the coded pixel values to be referred to when coding the coding target pixel value are limited to pixels within each block, so that the reference coded pixel values are small in number. Therefore, the accuracy of the predicted value of the coding target pixel is reduced, and the coding efficiency is not increased very much.

On the other hand, the coding method in pixel units is a method in which an input image signal is coded pixel by pixel, and in this coding method, it is possible to change the coding process for the input image signal pixel by pixel. Therefore, when this coding method includes a universal coding process, such as adaptive arithmetic coding in which code words are automatically updated pixel by pixel adaptively to the characteristics of the input image signal, an image signal having any characteristic can be coded with a significantly high coding efficiency.

However, since, on the decoding side, a coded image signal obtained by the pixel-by-pixel coding method including the universal coding process is subjected to a decoding process in which code words are updated in the same manner as on the coding side, when a transmission error occurs when the coded image signal is transmitted, the state in which the decoding process for the coded image signal cannot be carried out accurately because of the influence of the transmission error on the decoding side, continues long.

By the way, the block-by-block coding method and the pixel-by-pixel coding method can be combined, and in a coding method in which these coding methods are combined (hereinafter referring to this coding method as a combination coding method for explanation), code words can be adaptively changed for each pixel, and the influence of transmission error can be converged in each block, whereby a coding process with a high coding efficiency, such as adaptive arithmetic coding, can be performed while suppressing the influence of transmission error.

A description is now given of this combination coding method.

FIG. 13(a) shows the state in which a single frame screen is divided into a plurality of rectangle blocks, and FIG. 13(b) shows arrangement of pixels in blocks, especially in a coding target block being a target of coding and blocks in the vicinity of the coding target block. Needless to say, these pixels are arranged in matrix along horizontal scanning lines in the single frame screen.

In the figures, FG denotes a screen corresponding to a single frame, B1 denotes a coded block in which a coding process for an image signal has already been performed, Bx denotes a coding target block being a target of coding, and B0 denotes an uncoded block in which a coding process for an image signal has not been performed. When no distinction is made between blocks, blocks are denoted by B. BLu, BLs, BLh, and BLm denote upper, lower, left, and right boundaries of the coding target block in the single frame screen, respectively. A solid line circle shows a coded pixel whose pixel value has already been coded, and a dotted line circle shows an uncoded pixel whose pixel value has not been coded yet. Each block B is an image display region comprising 4×4 pixels, in the single frame screen FG.

FIG. 14 shows positional relationships between a coding target pixel Px to be coded and peripheral pixels P0~P9 surrounding the coding target pixel, and the pixel values of these peripheral pixels P0~P9 are referred to when the pixel value of the coding target pixel Px is predicted, so that these pixels are called reference pixels hereinafter.

The reference pixels P8 and P9 are pixels which are positioned in the same horizontal scanning line as the coding target pixel Px, and the reference pixels P9 and P8 are positioned one pixel and two pixels before the coding target pixel Px, respectively. The positions of the reference pixels P5 and P1 in the horizontal direction on the single frame screen FG correspond to the position of the coding target pixel Px, and the reference pixels P5 and P1 are positioned in a horizontal scanning line by one pixel and two pixels upper than the coding target pixel Px, respectively. Further, the reference pixels P3, P4, P6, and P7 are pixels which are positioned in the same horizontal scanning line as the reference pixel P5, the reference pixels P4 and P3 are positioned one pixel and two pixels before the coding target pixel Px, respectively, and the reference pixels P6 and P7 are positioned one pixel and two pixels after the coding target pixel Px, respectively. Further, the reference pixels P0 and P2 are pixels which are positioned in the same horizontal scanning line as the reference pixel P1, the reference pixel P0 is positioned one pixel before the reference pixel P1, and the reference pixel P2 is positioned one pixel after the reference pixel P1.

In the combination coding method, initially, an image signal corresponding to the single frame screen FG is divided correspondingly to plural blocks B constituting the single frame screen as shown in FIG. 13(a) and FIG. 13(b), and a coding process for the divided image signal is performed block by block.

This block-by-block coding process is completed by performing a horizontal process in which pixel values of pixels are successively coded from the left to the right along each horizontal pixel line in a block B, for all of the horizontal pixel lines in the block from the uppermost line to the lower most line.

In this coding process, as shown in FIG. 14, the pixel value of the coding target pixel Px is adaptively predicted from the pixel values of the reference pixels P0~P9 positioned in the vicinity of the coding target pixel, and code words used for the coding process of the coding target pixel are adaptively selected according to a predicted value obtained by the prediction.

Therefore, in the combination coding method, the influence of transmission error on the decoding side can be converged in each block, and the coding efficiency can be improved as compared with the simple block-by-block coding process.

FIG. 16(a), FIG. 16(b), and FIG. 17 are diagrams for explaining a combination decoding method corresponding to the above-mentioned combination coding method, and in the figures, B' denotes each block in a single frame, Bx' denotes a decoding target block, B1' denotes an already decoded block, B0' denotes an undecoded block, BLu', BLs', BLh', and Blm' denote block boundaries of the decoding target block Bx' at the upper, lower, left, and right sides, respectively, and P0'~P9' denote reference pixels corresponding to a decoding target pixel Px'. In this case, the arrangement of the reference pixels P0'~P9' with respect to the decoding target pixel Px' is identical to that described for the coding process shown in FIG. 13(a), FIG. 13(b), and FIG. 14.

In the combination decoding method, initially, an image signal corresponding to a single frame screen FG' is divided correspondingly to plural blocks B' constituting the single frame screen as shown in FIG. 16(a) and FIG. 16(b), and a decoding process for the divided image signal is performed block by block.

This block-by-block decoding process is completed by performing a horizontal process in which pixel values of pixels are successively decoded from the left to the right along each horizontal pixel line in a block B', for all of the horizontal pixel lines in the block from the uppermost line to the lower most line.

In this decoding process, as shown in FIG. 17, the pixel value of the decoding target pixel Px' is adaptively predicted from the pixel values of the reference pixels P0'~P9' positioned in the vicinity of the decoding target pixel, and code words used for the decoding process of the decoding target pixel Px' are adaptively selected according to a predicted value obtained by the prediction.

However, the combination coding method in which the block-by-block coding process and the pixel-by-pixel coding process are combined has the following drawbacks.

In this combination coding method, since the coding process proceeds block by block, when the coding target pixel Px abuts the right boundary BLm of the coding target block Bx as shown in FIG. 15, the reference pixels P2, P6, and P7 corresponding to the coding target pixel Px are uncoded pixels.

In this case, when the pixel value of the coding target pixel Px is predicted with reference to the pixel values of the uncoded pixels P2, P6, and P7 and the pixel value of the coding target pixel Px is coded using the predicted value, a coded image signal corresponding to this coding target pixel Px cannot be accurately decoded on the decoding side.

More specifically, in order to accurately decode a coded image signal which is obtained by coding the pixel value of the coding target pixel Px using the predicted value, the predicted value of the decoding target pixel Px' used in the decoding process must agree with the predicted value of the coding target pixel Px corresponding to the decoding target pixel Px', used in the coding process. In other words, on the coding side, the reference pixel values referred to for generating the predicted value of the coding target pixel Px must completely agree with the reference pixel values referred to for generating the predicted value of the decoding target pixel Px' corresponding to the coding target pixel Px.

For this reason, for example, as shown in FIG. 15, when the coding process for the coding target pixel Px is performed, if the predicted value of the coding target pixel Px is generated with reference to the pixel values of the uncoded pixels P2, P6, and P7 among the reference pixels P0~P9 corresponding to the coding target pixel Px, as shown in FIG. 18, when the decoding process for the decoding target pixel Px' is performed on the decoding side, the predicted value of the decoding target pixel Px' is generated with reference to the pixel values of the reference pixels P0'~P9' corresponding to the decoding target pixel Px', but among the reference pixels P0'~P9', pixel values of the undecoded pixels P2', P6', and P7' are not obtained on the decoding side, so that the pixel value of the decoding target pixel Px' corresponding to the coding target pixel Px cannot be decoded.

Therefore, in the conventional combination coding method, in order to avoid the problem that the decoding process becomes difficult when uncoded pixels are included in the reference pixels P0~P9 corresponding to the coding target pixel Px as described above, there is taken a countermeasure in which the predicted value of the coding target pixel Px is generated with the pixel values of the uncoded pixels being regarded as a fixed value which has been previously set (e.g., 0), and the coding process for the coding target pixel Px is performed using this predicted value.

Although the combination coding method with the above-mentioned countermeasure enables the decoding process to be accurately performed for all of the pixels in each block using their predicted values, since the pixel values of the reference pixels being uncoded pixels are uniformly replaced with a fixed value, the correlation of pixel values between the uncoded pixel and the coded pixel is degraded, resulting in the problem that the efficiency in predicting the coding target pixel, i.e., the accuracy of the predicted value of the coding target pixel, is degraded.

The present invention is subjected to solving the above-described problems, and has an object to provide an image processing apparatus and an image processing method, which can combine an adaptive pixel-by-pixel coding process and a block-by-block coding process, without degrading correlation of pixel values between uncoded pixels and coded pixels, with avoiding that decoding of a coded image signal becomes difficult, and to provide a data recording medium in which an image processing program for realizing the image processing method is recorded.

It is another object of the present invention to provide an image processing apparatus and an image processing method, which can perform an accurate decoding process for a coded image signal which has been coded, without degrading an efficiency in predicting coding target pixels, and to provide a data recording medium in which an image processing program for realizing the image processing method is recorded.

DISCLOSURE OF THE INVENTION

An image processing apparatus according to the present invention being an image coding apparatus for successively coding pixel values constituting an image signal on the basis of pixel values of plural peripheral pixels positioned in the vicinity of a coding target pixel, comprises blocking means for blocking an image signal comprising plural pixel values corresponding to a single image display region into blocks each comprising a prescribed number of pixels, and outputting, block by block, the prescribed number of pixel values constituting the image signal in each block; pixel value replacing means for replacing a pixel value of an uncoded pixel among the peripheral pixels with a pseudo pixel value that is obtained from a pixel value of a coded pixel among the peripheral pixels on the basis of a prescribed rule; and coding means for receiving the image signal comprising plural pixel values corresponding to each block, performing, for each block, a coding process in which the respective pixel values are successively coded on the basis of the pixel value of the coded pixel and the pseudo pixel value of the uncoded pixel, and outputting an coded image signal.

Since the image coding apparatus thus constructed is provided with the pixel value replacing means for replacing a pixel value of an uncoded pixel among plural peripheral pixels corresponding to a coding target pixel with a pseudo pixel value that is obtained on the basis of a pixel value of a coded pixel among the plural peripheral pixels, when a block-by-block coding process for an image signal corresponding to a single image display region is performed pixel by pixel, with reference to the pixel values of the peripheral pixels in the vicinity of the coding target pixel, even though the coding target pixel abuts on the block boundary and the plural reference peripheral pixels include an uncoded pixel, a pseudo pixel value having an improved correlation with the pixel values of the other peripheral pixels can be referred to as a pixel value of the uncoded pixel. Since this pseudo pixel value is obtained from a pixel value of a coded pixel in the vicinity of the coding target pixel, on the decoder side, with respect to an undecoded pixel to be referred to when a decoding target pixel is decoded, a pseudo pixel value obtained from a pixel value of a decoded pixel can be referred to in place of its pixel value.

Therefore, it is possible to combine an adaptive pixel-by-pixel coding process and a block-by-block coding process without degrading correlation of pixel values between the uncoded pixel and the coding target pixel, with avoiding that decoding of a coded signal becomes difficult on the decoding side.

Thereby, influence of transmission error can be converged block by block, and the coding efficiency can be improved as compared with the simple block-by-block coding process, and further, a decoding process for a coded signal which has been coded without degrading the prediction efficiency of the coding target pixel can be performed accurately.

According to the present invention, in the image coding apparatus, the pixel value replacing means is constructed so as to employ, as a pseudo pixel value of the uncoded pixel, a pixel value of a coded pixel which is positioned at the shortest spatial distance from the uncoded pixel.

Since, in the image coding apparatus thus constructed, the pixel value of the coded pixel which is the nearest to the uncoded pixel is employed as the pseudo pixel value of the uncoded pixel, the correlation between the pseudo pixel value of the uncoded pixel and the pixel values of the peripheral pixels can be improved.

According to the present invention, in the image coding apparatus, the pixel value replacing means is constructed so as to employ, as a pseudo pixel value of the uncoded pixel, a pixel value of a coded pixel which is positioned at the shortest spatial distance from the uncoded pixel and on the same horizontal scanning line as the uncoded pixel.

Since, in the image coding apparatus thus constructed, the pixel value of the coded pixel which is the nearest to the uncoded pixel and on the same horizontal scanning line as the uncoded pixel is employed as the pseudo pixel value of the uncoded pixel, the pseudo pixel value of the uncoded pixel can be obtained by a simple method, such as to hold the pixel value of the cod,ed pixel for a prescribed period of time.

According to the present invention, in the image coding apparatus, the coding means is constructed so as to comprise a prediction value generator for generating a prediction pixel value for the coding target pixel, on the basis of the pixel value of the coded pixel and the pseudo pixel value of the uncoded pixel; and an encoder for coding a difference value between the pixel value of the coding target pixel and the prediction pixel value of the coding target pixel, and outputting the coded difference value, block by block, as a coded image signal.

Since, in the image coding apparatus thus constructed, the difference value between the pixel value of the coding target pixel and the prediction pixel value is coded, the coding efficiency can be increased by reducing the code quantity required for coding the pixel value of the coding target pixel.

According to the present invention, in the image coding apparatus, the coding means is constructed so as to select code words for coding the pixel value of the coding target pixel, on the basis of the pixel value of the coded pixel and the pseudo pixel value of the uncoded pixel.

Since, in the image coding apparatus thus constructed, code words for coding the pixel value of the coding target pixel are selected on the basis of the pixel value of the coded pixel and the pseudo pixel value Of the uncoded pixel, in a coding process for an image signal, a highly efficient coding process can be realized by adaptively changing the code words pixel by pixel.

According to the present invention, in the image coding apparatus, the coding means is constructed so as to select a probability table corresponding to codes for arithmetically coding the pixel value of the coding target pixel, on the basis of the pixel value of the coded pixel and the pseudo pixel value of the uncoded pixel, and to perform an arithmetic coding process for the coding target pixel on the basis of the selected probability table.

Since, in the image coding apparatus thus constructed, a probability table corresponding to arithmetic codes for coding the coding target pixel is selected on the basis of the pixel value of the coded pixel and the prediction pixel value of the uncoded pixel, and coding of the pixel value for the coding target pixel is performed, a highly efficient coding process can be performed by adaptively changing the probability table, pixel by pixel, in the arithmetic coding process.

According to the present invention, the image coding apparatus further comprises local decoding means for decoding the pixel value of the coded pixel to generate a local decoded pixel value; wherein the pixel value replacing means is constructed so as to replace the pixel value of the uncoded pixel with a pseudo pixel value that is obtained from a local decoded pixel value corresponding to the coded pixel on the basis of a prescribed rule; and the coding means is constructed so as to perform a non-reversible coding process for the pixel value of the coding target pixel, on the basis of the local decoded pixel value of the coded pixel and the pseudo pixel value of the uncoded pixel.

Since, in the image processing apparatus thus constructed, the non-reversible coding process for the pixel value of the coding target pixel is performed on the basis of the decoded pixel value obtained by decoding the pixel value of the coded pixel, the pixel values of the peripheral pixels to be referred to in the non-reversible coding process for the coding target pixel can be identical to pixel values of peripheral pixels to be referred to in a decoding process for a decoding target pixel, whereby a coded image signal obtained by the non-reversible coding on the basis of the pixel values of the peripheral pixels can be accurately decoded on the decoder side.

According to the present invention, in the image coding apparatus, the coding means is constructed so as to comprise a prediction value generator for generating a prediction pixel value for the coding target pixel, on the basis of the local decoded pixel value of the coded pixel and the pseudo pixel value of the uncoded pixel; and an encoder for coding a difference value between the pixel value of the coding target pixel and the prediction pixel value of the coding target pixel, and outputting the coded difference value, block by block, as a coded image signal.

Since, in the image coding apparatus thus constructed, the prediction pixel value for the coding target pixel is generated from the pixel value of the coded pixel and the pseudo pixel value of the uncoded pixel, and the difference value between the pixel value of the coding target pixel and its prediction pixel value is coded, the coding efficiency can be improved by reducing the code quantity required for coding the pixel value of the coding target pixel.

According to the present invention, in the image coding apparatus, the coding means is constructed so as to select code words for coding the pixel value of the coding target pixel, on the basis of the local decoded pixel value of the coded pixel and the pseudo pixel value of the uncoded pixel.

Since, in the image coding apparatus thus constructed, code words for coding the pixel value of the coding target pixel are selected on the basis of the pixel value of the coded pixel and the pseudo pixel value of the uncoded pixel, in a coding process for an image signal, a highly efficient coding process can be realized by adaptively changing the code words pixel by pixel.

According to the present invention, in the image coding apparatus, the coding means is constructed so as to select a probability table corresponding to codes for arithmetically coding the pixel value of the coding target pixel, on the basis of the pixel value of the coded pixel and the pseudo pixel value of the uncoded pixel, and to perform an arithmetic coding process for the coding target pixel on the basis of the selected probability table.

Since, in the image coding apparatus thus constructed, a probability table corresponding to arithmetic codes for coding the coding target pixel is selected on the basis of the pixel value of the coded pixel and the pseudo pixel value of the uncoded pixel, and coding of the pixel value for the coding target pixel is Performed, a highly efficient coding process can be performed by adaptively changing the probability table, pixel by pixel, in he arithmetic coding process.

An image decoding apparatus according to the present invention being an image decoding apparatus for decoding, block by block, a coded image signal which is obtained by performing, for each block comprising a prescribed number of pixels, a process in which pixel values constituting an image signal are successively coded on the basis of pixel values of plural peripheral pixels positioned in the vicinity of a coding target pixel, comprises pixel value replacing means for replacing a pixel value of an undecoded pixel among plural peripheral pixels positioned in the vicinity of a decoding target pixel, with a pseudo pixel value that is obtained from a pixel value of a decoded pixel among the plural peripheral pixels on the basis of a prescribed rule; decoding means for receiving the coded image signal comprising plural pixel values corresponding to each block, performing, block by block, a decoding process in which the respective pixel values are successively decoded on the basis of the pixel value of the decoded pixel and the pseudo pixel value of the undecoded pixel, and outputting a decoded image signal corresponding to each block; and inverse blocking means for combining the decoded image signals corresponding to the respective blocks to convert these signals to a decoded image signal having a scanning line structure; wherein the decoded image signal having a scanning line structure is output as a reproduced image signal corresponding to a single image display screen.

Since the image decoding apparatus thus constructed is provided with the pixel value replacing means for replacing a pixel value of an undecoded pixel among plural peripheral pixels positioned in the vicinity of a decoding target pixel, with a pseudo pixel value that is obtained on the basis of a pixel value of a decoded pixel among the plural peripheral pixels, when a block-by-block decoding process for a coded image signal corresponding to a single image display region is performed pixel by pixel, with reference to the pixel values of the peripheral pixels in the vicinity of the decoding target pixel, even though the decoding target pixel abuts on the block boundary and the plural reference peripheral pixels include an undecoded pixel, a pseudo pixel value having an improved correlation with the pixel values of the other peripheral pixels can be referred to as a pixel value of the undecoded pixel.

Therefore, it is possible to realize a decoding method in which an adaptive pixel-by-pixel decoding process and a block-by-block decoding process are combined without degrading correlation of pixel values between the undecoded pixel and the decoding target pixel. Thereby, it is possible to accurately decode a coded image signal that has been coded by a coding method in which an adaptive pixel-by-pixel coding process and a block-by-block coding process are combined.

According to the present invention, in the image decoding apparatus, the pixel value replacing means is constructed so as to employ, as a pseudo pixel value of the undecoded pixel, a pixel value of a decoded pixel which is positioned at the shortest spatial distance from the undecoded pixel.

Since, in the image decoding apparatus thus constructed, the pixel value of the decoded pixel which is the nearest to the undecoded pixel is employed as the pseudo pixel value of the undecoded pixel, the correlation between the pseudo pixel value of the undecoded pixel and the pixel values of the peripheral pixels can be improved.

According to the present invention, in the image decoding apparatus, the pixel value replacing means is constructed so as to employ, as a pseudo pixel value of the undecoded pixel, a pixel value of a decoded pixel which is positioned at the shortest spatial distance from the undecoded pixel and on the same horizontal scanning line as the undecoded pixel.

Since, in the image decoding apparatus thus constructed, the pixel value of the decoded pixel which is the nearest to the undecoded pixel and on the same horizontal scanning line as the undecoded pixel is employed as the pseudo pixel value of the undecoded pixel, the pseudo pixel value of the undecoded pixel can be obtained by a simple method, such as to hold the pixel value of the decoded pixel for a prescribed period of time.

According to the present invention, in the image decoding apparatus, the decoding means is constructed so as to comprise a prediction value generator for generating a prediction pixel value for the decoding target pixel, on the basis of the pixel value of the decoded pixel and the pseudo pixel value of the undecoded pixel; and a decoder for generating a decoded pixel value by decoding the pixel value of the decoding target pixel, and adding the prediction pixel value of the decoding target value to the decoded pixel value.

Since, in the image decoding apparatus thus constructed, the prediction pixel value of the decoding target pixel is generated from the pixel value of the decoded pixel and the pseudo pixel value of the undecoded pixel, and the prediction pixel value is added to the decoded pixel value of the decoding target pixel, it is possible to accurately decode a coded image signal that is obtained by coding a difference value between a pixel value of a coding target pixel and its prediction pixel value.

According to the present invention, in the image decoding apparatus, the decoding means is constructed so as to select code words for decoding the pixel value of the decoding target pixel, on the basis of the pixel value of the decoded pixel and the pseudo pixel value of the undecoded pixel.

Since, in the image decoding apparatus thus constructed, code words for decoding the pixel value of the decoding target pixel are selected on the basis of the pixel value of the decoded pixel and the pseudo pixel value of the undecoded pixel, it is possible to accurately decode a coded image signal that is obtained in a highly efficient coding process in which the code words are adaptively changed pixel by pixel.

According to the present invention, in the image decoding apparatus, the decoding means is constructed so as to select a probability table corresponding to codes for arithmetically decoding the pixel value of the decoding target pixel, on the basis of the pixel value of the decoded pixel and the pseudo pixel value of the undecoded pixel, and to perform an arithmetic decoding process for the decoding target pixel on the basis of the selected probability table.

Since, in the image decoding apparatus thus constructed, a probability table corresponding to arithmetic codes for decoding the decoding target pixel is selected on the basis of the pixel value of the decoded pixel and the pseudo pixel value of the undecoded pixel, and decoding of the pixel value for the decoding target pixel is performed, it is possible to accurately decode a coded image signal that is obtained in an arithmetic coding process in which the probability table is adaptively changed pixel by pixel.

An image coding method according to the present invention is an image coding method for performing, for each block comprising a prescribed number of pixels, a coding process in which pixel values constituting an image signal are successively coded on the basis of pixel values of plural peripheral pixels positioned in the vicinity of a coding target pixel, wherein with respect to a coded pixel among the plural peripheral pixels, its pixel value is set as a reference pixel value and, with respect to an uncoded pixel among the plural peripheral pixels, a pseudo pixel value, which is obtained from a pixel value of a coded pixel among the peripheral pixels on the basis of a prescribed rule, is set as a reference pixel value; and the pixel value of the coding target pixel is coded on the basis of the reference pixel values set for the plural peripheral pixels for the coding target pixel, thereby generating a coded image signal corresponding to the image signal.

Since, in the image coding method thus constructed, the image signal is blocked correspondingly to respective blocks on a single image display region, and the pixel value of the coding target pixel in each block is coded with reference to the pixel values of the peripheral pixels, and at this time, when the peripheral pixel is a coded pixel, its pixel value is referred to, and when the peripheral pixel is an uncoded pixel, a pseudo pixel value that is obtained from a pixel value of a coded pixel is referred to in place of its pixel value, in the coding process, even though the coding target pixel abuts on the block boundary and the plural reference peripheral pixels include an uncoded pixel, a pseudo pixel value having an improved correlation with the pixel values of the other peripheral pixels can be referred to as a pixel value of the uncoded pixel. Since this pseudo pixel value is obtained from a pixel value of a coded pixel in the vicinity of the coding target value, on the decoder side, with respect to an undecoded pixel to be referred to when a decoding target pixel is decoded, a pseudo pixel value obtained from a pixel value of a decoded pixel can be referred to in place of its pixel value.

Therefore, it is possible to combine an adaptive pixel-by-pixel coding process and a block-by-block coding process without degrading correlation of pixel values between the uncoded pixel and the coding target pixel, with avoiding that decoding of a coded signal becomes difficult on the decoding side.

Thereby, influence of transmission error can be converged block by block, and the coding efficiency can be improved as compared with the simple block-by-block coding process, and further, a decoding process for a coded signal without degrading the prediction efficiency of the coding target pixel can be performed accurately.

An image decoding method according to the present invention is an image decoding method for decoding, block by block, a coded image signal which is obtained by performing, for each block comprising a prescribed number of pixels, a process in which pixel values constituting an image signal are successively coded on the basis of pixel values of plural peripheral pixels positioned in the vicinity of a coding target pixel, wherein with respect to a decoded pixel among plural peripheral pixels, its pixel value is set as a reference pixel value and, with respect to an undecoded pixel among the plural peripheral pixels, a pseudo pixel value, which is obtained from a pixel value of a decoded pixel among the peripheral pixels on the basis of a prescribed rule, is set as a reference pixel value; and a pixel value of a decoding target pixel is decoded on the basis of the reference pixel values set for the plural peripheral pixels for the decoding target pixel, thereby generating a decoded image signal corresponding to the coded image signal.

Since, in the image decoding method thus constructed, a process in which the pixel value of the decoding target pixel in each block is successively decoded with reference to the pixel values of the peripheral pixels, is performed for each block comprising plural pixels, and at this time, when the peripheral pixel is a decoded pixel, its pixel value is referred to, and when the peripheral pixel is an undecoded pixel, a pseudo pixel value that is obtained from a pixel value of a decoded pixel is referred to in place of its pixel value, in the decoding process, even though the decoding target pixel abuts on the block boundary and the plural reference peripheral pixels include an undecoded pixel, a pseudo pixel value having an improved correlation with the pixel values of the other peripheral pixels can be referred to as a pixel value of the undecoded pixel.

Therefore, it is possible to realize a decoding method in which an adaptive pixel-by-pixel decoding process and a block-by-block decoding process are combined without degrading correlation of pixel values between the undecoded pixel and the decoding target pixel. Thereby, it is possible to accurately decode a coded image signal that has been coded by a coding method in which an adaptive pixel-by-pixel coding process and a block-by-block coding process are combined.

A data recording medium according to the present invention is a data recording medium containing a program for performing an image signal coding process or decoding process, wherein the program is an image processing program for making a computer perform processing of an image signal by the image coding method.

Employing this data recording medium, error propagation when a transmission error occurs can be converged block by block, and the coding efficiency can be improved as compared with the simple block-by-block coding process, and further, it is possible to accurately perform a decoding process for a coded signal without degrading a prediction efficiency of a coding target pixel, and to accurately decode a coded image signal that has been coded by a coding method in which an adaptive pixel-by-pixel coding process and a block-by-block coding process are combined.

BRIEF DESCRIPTION OF THE DRAWINGS

FIG. 1 is a block diagram illustrating a construction of an image coding apparatus according to a first embodiment of the present invention.

FIG. 2 is a flowchart showing process steps of generating a pixel value of an uncoded pixel in a coding process by the image coding apparatus.

FIG. 3 is a block diagram illustrating a construction of an image coding apparatus according to a second embodiment of the present invention.

FIG. 4 is a block diagram illustrating a construction of an image coding apparatus according to a third embodiment of the present invention.

FIG. 5 is a block diagram illustrating a construction of an image coding apparatus according to a fourth embodiment of the present invention.

FIG. 6 is a block diagram illustrating a construction of an image coding apparatus according to a first modification of the fourth embodiment.

FIG. 7 is a block diagram illustrating a construction of an image coding apparatus according to a second modification of the fourth embodiment.

FIG. 8 is a block diagram illustrating a construction of an image decoding apparatus according to a fifth embodiment of the present invention.

FIG. 9 is a flowchart showing process steps of generating a pixel value of an undecoded pixel in a decoding process by the image decoding apparatus.

FIG. 10 is a block diagram illustrating a construction of an image decoding apparatus according to a sixth embodiment of the present invention.

FIG. 11 is a block diagram illustrating a construction of an image decoding apparatus according to a seventh embodiment of the present invention.

FIG. 12(a), FIG. 12(b), and FIG. 12(c) are diagrams showing a data recording medium containing a program for implementing the coding process by the image coding apparatus or the decoding process by the image decoding apparatus according to any of the aforementioned embodiments in a computer system.

FIG. 13(a) and FIG. 13(b) are schematic diagrams showing division of a single frame screen into plural blocks, in a block-by-block coding process.

FIG. 14 is a schematic diagram for explaining an adaptive pixel-by-pixel coding process.

FIG. 15 is a schematic diagram for explaining problems in a combination coding method in which the block-by-block coding process and the pixel-by-pixel coding process are combined.

FIG. 16(a) and FIG. 16(b) are schematic diagram showing division of a single frame screen into plural blocks, in a block-by-block decoding process.

FIG. 17 is a schematic diagram for explaining an adaptive pixel-by-pixel decoding process.

FIG. 18 is a schematic diagram for explaining problems in a combination, decoding method in which the block-by-block decoding process and the pixel-by-pixel decoding process are combined.

BEST EMBODIMENTS FOR EXECUTING THE INVENTION

A description is given of respective embodiments of the present invention using FIGS. 1 to 12.

Embodiment 1.

FIG. 1 is a block diagram illustrating a construction of an image coding apparatus 101 according to a first embodiment of the present invention.

This image coding apparatus 101 comprises a blocking unit 2 for dividing an input image signal is correspondingly to plural blocks constituting a single image display region (one frame), an encoder 16a for receiving an output Bs from the blocking unit 2 and performing reversible coding for a pixel value of a coding target pixel to be coded in a coding target block to be coded, with reference to a prediction pixel value (hereinafter referred to simply as a prediction value) Sp of the coding target pixel, and a prediction value generation unit 110 for generating the prediction pixel value Sp.

This prediction value generation unit 110 includes a mass storage main memory 4 capable of storing pixel values of pixels constituting the input image signal by, for example, numbers corresponding to one frame, and first and second auxiliary memories 6a and 6b of different hold periods of time, for temporarily holding pixel values M output from the main memory 4. In this case, the main memory 4 has a construction in which the pixel values corresponding to the reference pixels P0~P9 for the coding target pixel Px to be processed by the encoder 16a (see FIG. 14) are successively output from the stored pixel values, during a period of time required for a coding process of a pixel value. The first auxiliary memory 6a has a construction in which the pixel values M successively output from the main memory 4 are delayed by one pixel, and the second auxiliary memory 6b has a construction in which the pixel values M successively output from the main memory 4 are delayed by two pixels.

Further, the prediction value generation unit 110 includes a counter 8 for receiving the input image signal Is per frame and counting the number of pixel values, and a coded/uncoded decision unit 10 for deciding whether the pixel value being output from the main memory 4 is a pixel value of a coded pixel which has already been coded by the encoder 16a or a pixel value of an uncoded pixel which has not been coded yet, according to an output Cout from the counter 8 and information BNs relating to vertical and horizontal block numbers in each frame, supplied from the outside. In this case, the decision unit 10 also performs a process of measuring a distance between an uncoded pixel and a coded pixel that is on the same horizontal scanning line as the uncoded pixel and nearest to the uncoded pixel, with the number of pixels. The counter 8 is reset when the pixel values of all pixels constituting one frame have been input.

Furthermore, the prediction value generation unit 110 includes a selector switch 12 for selecting and outputting one of the outputs M, Ma, and Mb from the main memory 4, and the first and second auxiliary memories 6a and 6b, respectively, according to an output from the coded/uncoded decision unit 10, and a prediction value generator 14 for receiving outputs Sout from the selector switch 12 as the pixel values of the reference pixels P0~P9 required for generating a prediction pixel value for the coding target pixel Px, and generating the prediction pixel value Sp for the coding target pixel Px.

In the image coding apparatus 101, the encoder 16a performs a coding process for a difference value between the pixel value of the coding target pixel Px output from the blocking unit 2 and its prediction pixel value, and outputs a coded difference value as a coded pixel value corresponding to the coding target pixel Px. In this coding process, code words for coding the pixel value of the coding target pixel Px are selected on the basis of the prediction pixel value obtained from the pixel values of the reference pixels P0~P9.

A description is given of the operation.

FIG. 2 is a flowchart showing the coding process of the image coding apparatus 101, and the flow of the coding process will be described briefly along this flowchart.

When an image signal is input to the image coding apparatus 101, pixel values constituting the image signal are successively stored in the main memory 4, and the main memory 4 outputs pixel values of plural reference pixels (peripheral pixels) P0~P9 located in the vicinity of a coding target pixel Px, which reference pixels are referred to when the coding target pixel Px is coded (step S1)

Next, the first reference pixel in the plural reference pixels obtained by the main memory 4 is regarded as a decision target pixel (step S2), and the coded/uncoded decision unit 10 decides whether the decision target pixel is a coded pixel or not (step S3). Since in this coded/uncoded decision unit 10 the increment of the counter output Cout is synchronized with the operation of successively outputting the pixel values of the ten reference pixels P0~P9 from the main memory 4 according to a reference clock, the position of the reference pixel being output from the main memory 4, relative to the coding target pixel Px, can be detected by the counter output Cout.

As the result of the decision, when the decision target reference pixel is a coded pixel, its pixel value is received as a reference pixel value by the prediction value generator 14 (step S5), and when the decision target reference pixel is not a coded pixel, a reference pixel value (pseudo pixel value) of this reference pixel is generated from its peripheral coded pixels, and received by the prediction value generator 14 (step S4).

Next, it is decided whether all of the reference pixel values required for coding the coding target pixel are received by the prediction value generator 14 (step S6), and when all of the reference pixel values required are not received, the next reference pixel in the reference pixels obtained by the main memory 4 is regarded as the decision target (step S8), and the processes in steps S3~S6 are repeated. On the other hand, when all of the reference pixel values required are received by the prediction value generator 14, a prediction pixel value for the coding target pixel Px is generated according to the reference pixel values by the prediction value generator 14 (step S7).

Thereafter, the pixel value of the coding target pixel Px is received by the encoder 16a and, simultaneously, the prediction pixel value of the coding target pixel Px is received from the prediction value generator 14 (step S9), and in the encoder 16a, a coding process for the pixel value of the coding target pixel Px is carried out using the prediction pixel value (step S10).

A detailed description is now given of the operation of the image coding apparatus 101 in the coding process for the image signal, and the specific operations of the respective units in this apparatus in steps S1~S10.

When an input image signal Is is input to the image coding apparatus 101, plural pixels constituting the input image signal Is are grouped correspondingly to blocks constituting one frame, each block comprising plural pixels, by the blocking unit 2, and the pixel values corresponding to the pixels in each block are sent to the encoder 16a and, in the encoder 16a, a coding process in which pixel values of coding target pixels Px are coded pixel by pixel with reference to reference pixel values, is carried out block by block.

At this time, the pixel values constituting the input image signal Is of scanning line structure are successively stored in the main memory 4, and pixel values of reference pixels P0~P9 corresponding to the respective coding target pixels Px are output at a fixed read cycle (step S1). An output M from the main memory 4 is temporarily held in the first and second auxiliary memories 6a and 6b. The first auxiliary memory 6a holds the output from the main memory 4 for a period corresponding to one read cycle, and the second auxiliary memory 6b holds it for a period corresponding to two read cycles.

In the counter 8, with the first pixel value in one frame as a reference, the number of input pixel values is counted in accordance with the input image signal is, and this count value Cout is output toward the coded/uncoded decision unit 10. In the coded/uncoded decision unit 10, information BNs relating to vertical and horizontal block numbers in one frame is input from the outside, and a reference pixel designated by the block number information BNs and the output from the counter 8 is regarded as a decision target pixel to be decided whether it is a coded pixel or an uncoded pixel. For example, when a coding target pixel Px is decided as shown in FIG. 14, reference pixels P0~P9 for this coding target pixel are decided, and the pixel P0 whose pixel value is output from the main memory 4 first is regarded as a decision target pixel (step S2).

At this time, the pixel value of the reference pixel P0 is held in the first and second auxiliary memories 6a and 6b for one read period, and two read periods, respectively. In the coded/uncoded decision unit 10, the position of the coding target pixel in the coding target block is calculated on the basis of the counter output Cout and the block number information BNs, and it is decided whether the reference pixel is a coded pixel or an uncoded pixel (step S3) and, according to the result of the decision, the selector switch 12 is controlled.

Since the reference pixel P0 is a coded pixel as shown in FIG. 14, as the result of the decision by the coded/uncoded decision unit 10 (step S3), the selector switch 12 is controlled by the coded/uncoded decision unit 10 to select the output M from the main memory 4, whereby the pixel value of the reference pixel P0 is stored, as a reference pixel value, in the prediction value generator 14.

Thereafter, in the coded/uncoded decision unit 10, it is decided whether or not the pixel values of all the reference pixels for the coding target pixel Px are received by the prediction value generator 14 (step S6). In this case, since the reference pixel values of all the reference pixels P0~P9 are not received by the prediction value generator 14, the coded/uncoded unit 10 regards the pixel value of the reference pixel P1, which is output from the main memory 4 after the pixel value of the reference pixel P0, as a pixel value of a decision target pixel (step S8). Since the reference pixel P1 is a coded pixel like the reference pixel PO, the pixel value of the reference pixel P1 is subjected to the processes in steps S3, S5, S6, and S8.

Subsequently, the coded/uncoded unit 10 regards the pixel value of the reference pixel P2, which is output from the main memory 4 after the pixel value of the reference pixel P1, as a pixel value of a decision target pixel (step S8). Since this reference pixel P2 is an uncoded pixel adjacent to the coded pixel, unlike the reference pixels P0 and P1, the selector switch 12 is controlled by the coded/uncoded decision unit 10 to select the output Ma from the first auxiliary memory 6a, whereby the pixel value of the reference pixel P1 is stored in the prediction value generator 14 as a pseudo pixel value of the reference pixel P2 (step S4). Thereafter, the processes in step S6 and step 38 are executed.

Further, the reference pixels P3~P5 are subjected to the processes in steps S3, S5, S6, and S8 in the same manner as described for the reference pixel P0, and the reference pixel P6 is subjected to the processes in steps S3, S4, S6, and S8 in the same manner as described for the reference pixel P2.

Subsequently, the coded/uncoded unit 10 regards the pixel value of the reference pixel P7, which is output from the main memory 4 after the pixel value of the reference pixel P6, as a pixel value of a decision target pixel (step S8). Since this reference pixel P7 is an uncoded pixel that is positioned across one pixel from the coding target pixel Px, unlike the reference pixels P0~P6, the selector switch 12 is controlled by the coded/uncoded decision unit 10 to select the output Mb from the second auxiliary memory 6b, whereby the pixel value of the reference pixel P5 is stored in the prediction value generator 14 as a pseudo pixel value of the reference pixel P7 (step S4). Thereafter, the processes in step S6 and step S8 are executed.

Further, the reference pixels P8 and P9 are subjected to the processes in steps S3, S5, and S6 in the same manner as described for the reference pixel P0. At this time, the coded/uncoded unit 10 decides that the reference pixel values of all the reference pixels P0~P9 are received by the prediction value generator 14, and the prediction value generator 14 calculates a prediction pixel value Sp for the coding target pixel Px on the basis of the reference pixel values received (step S7).

Thereafter, the pixel value of the coding target pixel Px and the prediction pixel value Sp are received by the encoder 16a (step S9), and a difference value between the pixel value of the coding target pixel Px and its prediction pixel value Sp is subjected to a coding process, and the coded difference value is output as a coded signal of the coding target pixel Px (step S10). This coding process employs code words. selected on the basis of the prediction pixel value Sp.

In this way, the pixel values in the respective blocks in one frame are successively coded. Since the first pixel in one frame has no coded pixel for reference in its vicinity, its coding process is carried out with a prediction pixel value of 0.

As described above, according to the first embodiment of the invention, when a pixel value of an uncoded pixel is referred to, since a pixel value of a coded pixel in its vicinity is referred to, it is possible to combine the adaptive pixel-by-pixel coding process and the block-by-block coding process without degrading correlation of pixel values between the uncoded pixel and the coding target pixel, and with avoiding that decoding of a coded signal becomes difficult. Thereby, influence of transmission error can be converged block by block, and the coding efficiency can be improved as compared with the simple block-by-block coding process, and further, on the decoding side, it is possible to accurately perform a decoding process for a coded signal which has been coded with no degradation in prediction efficiency of the coding target pixel.

More specifically, when a coding process for a coding target pixel has been carried out with reference to pixel values of its peripheral pixels on the coding side, a decoding process for a decoding target pixel must be also carried out with reference to pixel values of its peripheral pixels on the decoding side, and further, the pixel values referred to in the coding process must agree with the pixel values referred to in the decoding process.

In the conventional coding method, when the reference pixel is an uncoded pixel, a fixed value is used as its pixel value. In this case, however, there is a problem that the correlation of pixel values is degraded.

On the other hand, according to the present invention, when the reference pixel is an uncoded pixel, a pseudo pixel value for the uncoded pixel is generated from coded reference pixels, according to a prescribed rule. For example, for the uncoded pixels P2, P6, and P7 shown in FIG. 15, their pixel values are uniquely decided from the pixel values of the coded pixels P0, P1, P3, P4, P5, P8, and P9. The easiest manner is to use a pixel value of a coded pixel positioned on the same horizontal scanning line as and nearest to the uncoded pixel, as the pseudo pixel value for the uncoded pixel. In this case, the pixel value of the uncoded pixel P2 is replaced with the pixel value of the coded pixel P1, and the pixel values of the uncoded pixels P6 and P7 are replaced with the pixel value of the coded pixel P5.

Thus, the correlation of pixel values between the coded pixel and the uncoded pixel at the block boundary is increased, whereby a highly efficient coding process can be realized using the same prediction method as used for the inside of block where the inter-pixel correlation is great.

Therefore, an image signal can be recorded and transmitted with less bit number, without deteriorating the image quality.

While in the first embodiment two auxiliary memories 6a and 6b of different hold times for holding the output M from the main memory 4 are provided, only one auxiliary memory for temporarily holding the output from the main memory 4 may be provided, and the time for holding the pixel value output from the main memory 4 may be changed by the coded/uncoded decision unit 10 according to the distance between the uncoded pixel and the coding target pixel.

Further, while in the first embodiment only the prediction pixel value of the coding target pixel Px is referred to in the coding process for the image signal, the coding process may be performed on the basis of, not only the prediction pixel value of the coding target pixel Px, but also the prediction probability that shows the accuracy of the prediction pixel value.

In this case, when the image signal being a target of the coding process is a binary shape signal, since the prediction pixel value is either "0" or "1", only the prediction probability may be referred to, with the prediction pixel value being fixed to either "0" or "1".

Hereinafter, as a second embodiment of the invention, an image coding apparatus for performing a coding process of a binary shape signal with reference to only a prediction probability in place of the prediction pixel value will be described, and as a third embodiment of the invention, an image coding apparatus for performing a coding process of a multivalued image signal with reference to both the prediction pixel value and a prediction probability will be described.

Embodiment 2

FIG. 3 is a block diagram illustrating a construction of an image coding apparatus 102 according to a second embodiment of the present invention. In the figure, the same reference numerals as those shown in FIG. 1 designate the same parts as in the image coding apparatus 101 described in the first embodiment.

This image coding apparatus 102 includes a prediction probability generator 22 in place of the prediction value generator 14 in the image coding apparatus 101 according to the first embodiment, and has such a construction as to perform a coding process for a binary shape signal whose pixel value is either "0" or "1".

The prediction probability generator 22 has a construction in which as a prediction probability, a probability of a pixel value of a coding target pixel Px matching with a prediction pixel value is obtained from pixel values of reference pixels P0~P9 for the coding target pixel Px, and then a prediction probability signal Sk for the coding target pixel Px is output toward the encoder 16b.

In this case, since this image coding apparatus 102 is for a coding process of a binary shape signal, in the encoder 16b, a prediction value which is subtracted from the pixel value of the coding target pixel Px is set at either "0" or "1". The encoder 16b has a construction in which, when the prediction probability is high, since the probability of the pixel value of the coding target pixel Px matching with its prediction pixel value is high, a difference value between the pixel value of the coding target pixel Px and the prediction pixel value is coded by a coding method which increases the coding efficiency when the difference value is 0, and on the other hand, when the prediction probability is low, since the probability of the pixel value of the coding target pixel Px matching with the prediction pixel value is low, a difference value between the pixel value of the coding target pixel Px and the prediction pixel value is coded by a coding method which increases the coding efficiency when the difference value is not 0.

A description is given of the function and effect.

Here, the operation identical to that of the image coding apparatus according to the first embodiment is not described.

Also in the binary shape signal coding process by the image coding apparatus 102 thus constructed, with respect to uncoded pixels among the reference pixels P0~P9 for the coding target pixel Px, their pixel values are generated from the pixel values of the coded pixels as in the image coding apparatus 101 according to the first embodiment, and the pixel values corresponding to all the reference pixels P0~P9 are stored in the prediction probability generator 22.

In the prediction probability generator 22, on the basis of the pixel values of the reference pixels P0~P9, a prediction probability for the coding target pixel Px is obtained. This prediction probability information Sk is output from the prediction probability generator 22 to the encoder 16b, and in the encoder 16b, a difference value between the pixel value of the coding target pixel Px and a previously set prediction pixel value is subjected to a coding process according to the prediction probability information Sk.

As described above, according to the second embodiment of the invention, in the image coding apparatus 102 for performing a coding process of a binary shape signal, a coding target pixel adjacent to the block boundary, for which generation of a prediction value is difficult, can be coded while suppressing degradation in coding efficiency. Therefore, influence of transmission error can be converged block by block, and the coding efficiency can be increased as compared with the simple block-by-block coding process, and further, on the decoding side, it is possible to accurately perform a decoding process for a coded signal without degrading the efficiency in predicting the coding target pixel.

By the way, a coding process based on a prediction probability is disclosed in, for example, International Standard JBIG (Joint Bi-level Image Coding Experts Group), but a coding method disclosed in this Standard is to perform a pixel-by-pixel coding process (not block-by-block), so that reference pixels are always coded pixels, and it does not disclose the problem when the reference pixels are uncoded pixels in the block-by-block coding process, which problem is to be solved by the present invention, and a countermeasure as to how to set pixel values corresponding to these uncoded pixels.

Embodiment 3

FIG. 4 is a block diagram illustrating a construction of an image coding apparatus 103 according to a third embodiment of the present invention. In the figure, the same reference numerals as those shown in FIG. 1 designate the same parts as in the image coding apparatus 101 described in the first embodiment.

This image coding apparatus 103 is for performing a coding process for a multivalued image signal as described above, and has a construction in which a prediction probability generation unit 130 includes a prediction probability generator 22 in addition to the prediction value generator 14 in the image coding apparatus 101 described in the first embodiment.

Like the prediction value generator 14, the prediction probability generator 22 has a construction to receive outputs Sout from the selector switch 12, to successively store pixel values of reference pixels P0~P9 for a coding target pixel Px, and to output, on the basis of these pixel values, a prediction probability Sk that shows the accuracy of a prediction pixel value Sp which is predicted on the basis of the reference pixels P0~P9 in the prediction value generator 14.

The encoder 16c has a construction in which the pixel value of the coding target pixel is coded on the basis of the prediction pixel value Sp from the prediction value generator 14 and the prediction probability Sk from the prediction probability generator 22.

To be specific, when the accuracy of the prediction pixel value is high, since the difference between the pixel value of the coding target pixel and the prediction pixel value is small, the encoder 16c performs a coding process for the pixel value of the coding target pixel Px by a coding method which increases the coding efficiency when the difference between the pixel value of the coding target pixel and the prediction pixel value is small. On the other hand, when the accuracy of the prediction value is low, since the difference between the pixel value of the coding target pixel and the prediction pixel value is large, the encoder 16c performs a coding process for the pixel value of the coding target pixel Px by a coding method which increases the coding efficiency when the difference between the pixel value and the prediction pixel value is relatively large.

Also in the multivalued image signal coding process by the image coding apparatus 103 thus constructed, with respect to uncoded pixels among the reference pixels P0~P9 for the coding target pixel Px, their pixel values are generated from the pixel values of the coded pixels as in the image coding apparatus 101 according to the first embodiment, and the pixel values corresponding to all the reference pixels P0~P9 are stored in the prediction probability generator 22 and the prediction value generator 14.

In the prediction value generator 14, a prediction pixel value of the coding target pixel Px is obtained from the reference pixels P0~P9 as in the first embodiment. Further, in the prediction probability generator 22, a prediction probability Sk for the coding target pixel Px is obtained on the basis of the pixel values of the reference pixels P0~P9.

When the prediction pixel value Sp and the prediction probability Sk are output to the encoder 16c, the encoder 16c performs a coding process according to the prediction probability Sk for a difference value between the pixel value of the coding target pixel Px and the prediction pixel value from the prediction value generator 14.

As described above, according to the third embodiment of the invention, in the image coding apparatus 103 for coding a multivalued signal, a coding target pixel adjacent to the block boundary, for which generation of a prediction value is difficult, can be coded while suppressing degradation in coding efficiency. Therefore, influence of transmission error can be converged block by block, and the coding efficiency can be increased as compared with the simple block-by-block coding process, and further, on the decoding side, it is possible to accurately perform a decoding process for a coded signal without degrading the efficiency in predicting the coding target pixel.

Embodiment 4

FIG. 5 is a block diagram illustrating a construction of an image coding apparatus 104 according to a fourth embodiment of the present invention. In the figure, the same reference numerals as those shown in FIG. 1 designate the same parts as in the image coding apparatus described in the first embodiment.

This image coding apparatus 104 is different from the image coding apparatus 101 according to the first embodiment in that a blocked image signal Bs is subjected to a non-reversible coding process.

More specifically, the image coding apparatus 104 includes an encoder 16d for performing a non-reversible coding process including a DCT (Discrete Cosine Transformation) process to an output Bs from the blocking unit 2, on the basis of a prediction pixel value from the prediction value generator 14, in place of the encoder 16a for performing a reversible coding process according to the first embodiment. Further, a prediction value generation unit 140 in this image coding apparatus 104 includes a local decoder 24 that decodes an output Cs from the encoder 16d on the basis of the prediction pixel value Sp from the prediction value generator 14, wherein an output LDs from the local decoder 24 is stored in the main memory 4 as a pixel value of a decoded pixel, and the output LDs is input to the counter 8. The other construction is identical to that of the image coding apparatus 101 according to the first embodiment.

In the image coding apparatus 104 so constructed, when an input image signal Is is coded on the basis of a prediction pixel value Sp of a coding target pixel Px, in the prediction value generator 140 that generates the prediction pixel value Sp, the local decoder 24 decodes an output Cs from the encoder 16d with reference to the prediction pixel value Sp, and the decoded pixel value is stored in the main memory 4.

Therefore, in the image coding apparatus 104 performing a non-reversible coding process, the decoded pixel value is used for generating the prediction pixel value, whereby the coded image signal coded by this image coding apparatus can be decoded accurately in an image decoding apparatus.

Although in the fourth embodiment only the prediction pixel value of the coding target pixel Px is referred to in the image signal non-reversible coding process, not only the prediction pixel value of the coding target pixel Px but also the prediction probability showing the accuracy of the prediction pixel value may be referred to.

In this case, when the image signal subjected to the non-reversible coding process is a binary shape signal, since the prediction pixel value is either "0" or "1", only the prediction probability may be referred to, while fixing the prediction pixel value to either "0" or "1".

Hereinafter, a description is given of an image coding apparatus according to a first modification of the fourth embodiment of the invention, which performs a non-reversible coding process for a binary shape signal with reference to only the prediction probability in place of the prediction pixel value, and an image coding apparatus according to a second modification of the fourth embodiment, which performs a non-reversible coding process for a multivalued image signal with reference to both the prediction pixel value and the prediction probability.

FIG. 6 is a block diagram illustrating a construction of an image coding apparatus 104a according to the first modification of the fourth embodiment of the invention. In the figure, the same reference numerals as those shown in FIG. 5 designate the same parts as in the image coding apparatus 104 according to the fourth embodiment.

This image coding apparatus 104a includes a prediction probability generator 22 in place of the prediction value generator 14 in the image coding apparatus 104 according to the fourth embodiment, and performs a coding process for a binary shape signal whose pixel value is either "0" or "1".

The prediction probability generator 22 has a construction in which as a prediction probability, a probability of a pixel value of a coding target pixel Px matching with a prediction pixel value is obtained from pixel values of reference pixels P0~P9 for the coding target pixel Px, and then the prediction probability Sk for the coding target pixel Px is output toward the encoder 16e and the local decoder 24.

In this case, since this image coding apparatus is for treating a binary shape signal as its processing target, in the encoder 16e, the prediction pixel value for the coding target pixel Px is set at either "0" or "1". Like the encoder 16b according to the second embodiment, this encoder 16e has a construction in which, when the prediction probability is high, a difference value between the pixel value of the coding target pixel Px and the prediction pixel value is coded by a coding method which increases the coding efficiency when the difference value is 0, and on the other hand, when the prediction probability is low, a difference value between the pixel value of the coding target pixel Px and the prediction pixel value is coded by a coding method which increases the coding efficiency when the;difference value is not 0.

Further, the local decoder 24 performs a decoding process while switching the decoding method on the basis of the prediction probability, like the encoder 16e.

Here, the operation identical to that of the image coding apparatus according to the fourth embodiment is not described.

Also in the binary shape signal coding process by the image coding apparatus 104a thus constructed, with respect to uncoded pixels among the reference pixels P0~P9 for the coding target pixel Px, their pixel values are generated from the pixel values of the coded pixels as in the image coding apparatus 104 according to the fourth embodiment, and the pixel values corresponding to all the reference pixels P0~P9 are stored in the prediction probability generator 22.

In the prediction probability generator 22, on the basis of the pixel values of the reference pixels P0~P9, a prediction probability Sk for the coding target pixel Px is obtained. This prediction probability Sk is output from the prediction probability generator 22 to the encoder 16e and the local decoder 24, and in the encoder 16e, a non-reversible coding process according to the prediction probability Sk is performed for a difference value between the pixel value of the coding target pixel Px and a previously set prediction pixel value. At this time, the local decoder 24 performs a decoding process for an output Cs from the encoder 16e according to the prediction probability Sk, whereby the pixel value of the coding target pixel Px is reproduced. This reproduced pixel value of the coding target pixel Px is stored in the main memory 4.

As described above, according to the first modification of the fourth embodiment, in the image coding apparatus 104a performing a non-reversible coding process for a binary shape signal, a coding target pixel adjacent to the block boundary, for which generation of a prediction value is difficult, can be coded while suppressing degradation in coding efficiency. Therefore, influence of transmission error can be converged block by block, and the coding efficiency can be increased as compared with the simple block-by-block coding process, and further, on the decoding side, it is possible to accurately perform a decoding process for a coded signal without degrading the efficiency in predicting the coding target pixel.

FIG. 7 is a block diagram illustrating a construction of an image coding apparatus 104b according to the second modification of the fourth embodiment of the invention. In the figure, the same reference numerals as those shown in FIG. 4 designate the same parts as in the image coding apparatus 104 according to the fourth embodiment.

This image coding apparatus 104b is for performing a non-reversible coding process for a multivalued image signal as described above, and has a construction in which a prediction probability generation unit 140b includes a prediction probability generator 22 in addition to the prediction value generator 14 in the image coding apparatus 104 according to the fourth embodiment.

Like the prediction value generator 14, the prediction probability generator 22 has a construction to receive outputs Sout from the selector switch 12, to successively store pixel values of reference pixels P0~P9 for a coding target pixel Px, and to output, on the basis of these pixel values, a prediction probability Sk that shows the accuracy of a prediction pixel value Sp which is predicted on the basis of the reference pixels P0~P9 in the prediction value generator 14.

The encoder 16f has a construction to perform a non-reversible coding process for the pixel value of the coding target pixel Px on the basis of the prediction pixel value Sp from the prediction value generator 14 and the prediction probability Sk from the prediction probability generator 22, and the specific structure thereof is identical to that of the encoder 16c according to the third embodiment.

Further, the local decoder 24 performs a decoding process while switching the coding method according to the prediction probability, like the encoder 16e.

Also in the multivalued image signal coding process by the image coding apparatus 104b thus constructed, with respect to uncoded pixels among the reference pixels P0~P9 for the coding target pixel Px, their pixel values are generated from the pixel values of the coded pixels as in the image coding apparatus 104 according to the fourth embodiment, and the pixel values corresponding to all the reference pixels P0~P9 are stored in the prediction probability generator 22 and the prediction value generator 14.

In the prediction value generator 14, a prediction pixel value of the coding target pixel Px is obtained from the reference pixels P0~P9 as in the fourth embodiment. Further, in the prediction probability generator 22, a prediction probability Sk for the coding target pixel Px is obtained on the basis of the pixel values of the reference pixels P0~P9.

The prediction pixel value Sp and the prediction probability Sk are output to the encoder 16f and the local decoder 24, and in the encoder 16f, a difference value between the pixel value of the coding target pixel Px and a previously set prediction pixel value is subjected to a coding process according to the prediction probability Sk. At this time, the local decoder 24 performs a decoding process for an output Cs from the encoder 16f according to the prediction probability Sk, whereby the pixel value of the coding target pixel Px is reproduced. This reproduced pixel value of the coding target pixel Px is stored in the main memory 4.

Therefore, degradation in coding efficiency is avoided with respect to an image signal for which generation of a prediction value is difficult, and a significant increase in coding efficiency can be realized with respect to an image signal for which a prediction value is easy generated.

As described above, according to the second modification of the fourth embodiment, in the image coding apparatus 104b performing non-reversible coding of a multivalued signal, a coding target pixel adjacent to the block boundary, for which generation of a prediction value is difficult, can be coded while suppressing degradation in coding efficiency. Therefore, influence of transmission error can be converged block by block, and the coding efficiency can be increased as compared with the simple block-by-block coding process, and further, on the decoding side, it is possible to accurately perform a decoding process for a coded signal without degrading the efficiency in predicting the coding target pixel.

Embodiment 5

FIG. 8 is a block diagram illustrating a construction of an image decoding apparatus 105 according to a fifth embodiment of the present invention.

The image decoding apparatus 105 according to this fifth embodiment reversibly decodes a coded image signal which has been reversibly coded by the image coding apparatus 101 according to the first embodiment.

This image decoding apparatus 105 includes a decoder 26a for decoding an input coded image signal Cs for each of plural blocks constituting a single image display region, more specifically, for decoding a pixel value of a decoding target pixel Px' being a target of a decoding process, i.e., a coded signal which is obtained by coding a pixel value of a coding target pixel Px, with reference to a prediction pixel value of the decoding target pixel, an inverse blocking unit 30 for combining decoded image signals Ds corresponding to the respective blocks output from the decoder 26a to generate a reproduced image signal Rs having a prescribed scanning line structure, and a prediction value generation unit 150 for generating the prediction pixel value on the basis of pixel values of reference pixels P0'~P9' located in the vicinity of the decoding target pixel Px'.

The prediction value generation unit 150 is similar to the prediction value generation unit 110 included in the image coding apparatus 101 according to the first embodiment.

To be specific, the generation value generation unit 150 includes a mass storage main memory 4 capable of storing pixel values by, for example, numbers corresponding to one frame, and first and second auxiliary memories 6a and 6b of different hold periods of time, for temporarily holding pixel values M output from the main memory 4. In this case, the main memory 4 has a construction in which the pixel values corresponding to the reference pixels P0'~P9' for the decoding target pixel Px' to be processed by the decoder 26a (see FIG. 17) are successively output from the stored pixel values, during a period of time required for a coding process of a pixel value. The first auxiliary memory 6a has a construction in which the pixel values M successively output from the main memory 4 are delayed by one pixel, and the second auxiliary memory 6b has a construction in which the pixel values M successively output from the main memory 4 are delayed by two pixels.

Further, the prediction value generation unit 150 includes a counter 8 for receiving the decoded image signal Ds per frame and counting the number of pixel values, and a decoded/undecoded decision unit 20 for deciding whether the pixel value being output from the main memory 4 is a pixel value of a decoded pixel which has already been decoded by the decoder 26a or a pixel value of an undecoded pixel which has not been decoded yet, according to an output Cout from the counter 8 and information BNs relating to vertical and horizontal block numbers in each frame, supplied from the outside. In this case, the decision unit 20 also performs a process of measuring a distance between an undecoded pixel and a decoded pixel that is on the same horizontal scanning line as and nearest to the undecoded pixel, with the number of pixels. The counter 8 is reset when the pixel values of all pixels constituting one frame are input.

Furthermore, the prediction value generation unit 150 includes a selector switch 12 for selecting and outputting one of the outputs M, Ma, and Mb from the main memory 4, and the first and second auxiliary memories 6a and 6b, respectively, according to an output Scont from the decoded/undecoded decision unit 20, and a prediction value generator 14 for receiving outputs Sout from the selector switch 12 as the pixel values of the reference pixels P0'~P9' required for generating a prediction pixel value for the decoding target pixel Px', and generating the prediction pixel value Sp for the decoding target pixel Px'.

In the image decoding apparatus 105, the decoder 26a decodes a coded difference value for the coding target pixel Px which is input as a coded image signal from the outside to generate a decoded difference value, and adds the prediction pixel value Sp from the prediction value generation unit 150 to the decoded difference value to generate a decoded pixel value of the decoding target pixel and output the same to the inverse blocking unit 30.

A description is given of the operation.

FIG. 9 is a flowchart showing the decoding process of the image decoding apparatus 105, and the flow of the decoding process will be described briefly along this flowchart.

When a coded image signal Cs is input to this image coding apparatus 105, the decoder 26a performs a decoding process for the coded image signal Cs, according to a prediction signal Sp from the prediction value generation unit 150.

At this time, a plurality of decoded pixel values output from the decoder 26a and corresponding to one frame are successively stored in the main memory 4, and the main memory 4 outputs pixel values of plural reference pixels (peripheral pixels) P0'~P9' located in the vicinity of a decoding target pixel Px', which reference pixels are referred to when the decoding target pixel Px' is decoded (step S11).

Next, the first reference pixel among the plural reference pixels obtained by the main memory 4 is regarded as a decision target pixel (step S12), and the decoded/undecoded decision unit 20 decides whether the decision target pixel is a decoded pixel or not (step S13). Since in this decoded/undecoded decision unit 20 the increment of the counter output Cout is synchronized with the operation of successively outputting the pixel values of the ten reference pixels P0'~P9' from the main memory 4 according to a reference clock, the position of the reference pixel being output from the main memory 4, relative to the decoding target pixel Px', can be detected by the counter output Cout.

As the result of the decision, when the decision target reference pixel is a decoded pixel, its pixel value is received as a reference pixel value by the prediction value generator 14 (step S15), and when the decision target reference pixel is not a decoded pixel, a reference pixel value (pseudo pixel value) of this reference pixel is generated from its peripheral decoded pixels, and received by the prediction value generator 14 (step S14).

Next, it is decided whether all of the reference pixel values required for decoding the decoding target pixel are received by the prediction value generator 14 (step S16), and when all of the reference pixel values required are not received, the next reference pixel in the reference pixels obtained by the main memory 4 is regarded as the decision target (step S18), and the processes in steps S13~S16 are repeated. On the other hand, when all of the reference pixel values required are received by the prediction value generator 14, a prediction pixel value for the decoding target pixel Px' is generated according to the reference pixel values by the prediction value generator 14 (step S17).

Thereafter, the pixel value of the decoding target pixel Px' is received by the decoder 26a and, simultaneously, the prediction pixel value of the decoding target pixel Px' is received from the prediction value generator 14 (step S19), and in the decoder 26a, a decoding process for the pixel value of the decoding target pixel Px' is carried out using the prediction pixel value (step S20).

A detailed description is now given of the operation of the image decoding apparatus 105 in the decoding process for the image signal, and the specific operations of the respective units in this apparatus in steps S11~S20.

When a coded image signal Cs is input to the image decoding apparatus 105, the coded image signal Cs is transmitted to the decoder 26a, and in the decoder 26a, a decoding process in which pixel values of decoding target pixels Px' are decoded pixel by pixel with reference to reference pixel values, is performed block by block.

At this time, the pixel values output from the decoder 26a and constituting one frame are successively stored in the main memory 4, and pixel values of reference pixels P0'~P9' for each decoding target pixel Px' are output at a fixed read cycle (step S11). An output M from the main memory 4 is temporarily held in the first and second auxiliary memories 6a and 6b. The first auxiliary memory 6a holds the output from the main memory 4 for a period corresponding to one read cycle, and the second auxiliary memory 6b holds it for a period corresponding to two read cycles.

In the counter 8, with the first pixel value in one frame as a reference, the number of input pixel values is counted in accordance with outputs Ds from the decoder 26a, and this count value Cout is output toward the decoded/undecoded decision unit 20. In this decoded/undecoded decision unit 20, information BNs relating to vertical and horizontal block numbers in one frame is input from the outside, and a reference pixel designated by the block number information BNs and the output from the counter 8 is regarded as a decision target pixel to be decided whether it is a decoded pixel or an undecoded pixel. For example, when a decoding target pixel Px' is decided as shown in, FIG. 17, reference pixels P0'~P9' for this decoding target pixel are decided, and the pixel P0' whose pixel value is output from the main memory 4 first is regarded as a decision target pixel (step S12).

At this time, the pixel value of the reference pixel P0' is held in the first and second auxiliary memories 6a and 6b for one read period, and two read periods, respectively. In the decoded/undecoded decision unit 20, the position of the decoding target pixel in the decoding target block is calculated on the basis of the counter output Cout and the block number information BNs, it is decided whether the reference pixel is a decoded pixel or an undecoded pixel, and according to the result of the decision, the selector switch 12 is controlled.

Since this pixel P0' is a decoded pixel as shown in FIG. 17, as the result of the decision by the decoded/undecoded decision unit 20 (step S13), the selector switch 12 is controlled by the decoded/undecoded decision unit 20 to select the output M from the main memory 4, whereby the pixel value of the reference pixel P0' is stored, as a reference pixel value, in the prediction value generator 14.

Thereafter, in the decoded/undecoded decision unit 20, it is decided whether or not the pixel values of all the reference pixels for the decoding target pixel Px' are received by the prediction value generator 14 (step S16). In this case, since the reference pixel values of all the reference pixels P0'~P9' are not received by the prediction value generator 14, the decoded/undecoded decision unit 20 regards the pixel value of the reference pixel P1', which is output from the main memory 4 after the pixel value of the reference pixel P0', as a pixel value of a decision target pixel (step S18). Since the reference pixel P1' is a decoded pixel like the reference pixel P0', the pixel value of the reference pixel P1' is subjected to the processes in steps S13, S15, S16, and S18.

Subsequently, the decoded/undecoded decision unit 20 regards the pixel value of the reference pixel P2', which is output from the main memory 4 after the pixel value of the reference pixel P1', as a pixel value of a decision target pixel (step S18). Since this reference pixel P2' is an undecoded pixel adjacent to the decoded pixel, unlike the reference pixels P0' and P1', the selector switch 12 is controlled by the decoded/undecoded decision unit 20 to select the output Ma from the first auxiliary memory 6a, whereby the pixel value of the reference pixel P1' is stored in the prediction value generator 14 as a pseudo pixel value of the reference pixel P2' (step S14). Thereafter, the processes in step S16 and step S18 are executed.

Further, the reference pixels P3'~P5' are subjected to the processes in steps S13, S15, S16, and S18 like the reference pixel P0', and the reference pixel P6' is subjected to the processes in steps S13, S14, S16, and S18 like the reference pixel P2'.

Subsequently, the decoded/undecoded decision unit 20 regards the pixel value of the reference pixel P7', which is output from the main memory 4 after the pixel value of the reference pixel P6', as a pixel value of a decision target pixel (step S18). Since this reference pixel P7' is an undecoded pixel that is positioned across one pixel from the decoding target pixel, unlike the reference pixels P0'~P6', the selector switch 12 is controlled by the decoded/undecoded decision unit 20 to select the output Mb from the second auxiliary memory 6b, whereby the pixel value of the reference pixel P5' is stored in the prediction value generator 14 as a pseudo pixel value of the reference pixel P7' (step S14). Thereafter, the processes in step S16 and step S18 are executed.

Further, the reference pixels P8' and P9' are subjected to the processes in steps S13, S15, and S16 like the reference pixel P0'. At this time, the decoded/undecoded decision unit 20 decides that the reference pixel values of all the reference pixels P0'~P9' are received by the prediction value generator 14, and the prediction value generator 14 calculates a prediction pixel value for the decoding target pixel Px' on the basis of the reference pixel values received (step S17).

Thereafter, the pixel value of the decoding target pixel Px' and the prediction pixel value are received by the decoder 26a (step S19), and a value obtained by adding the pixel value of the decoding target pixel Px' and the prediction pixel value is output as a decoded image signal Ds of the decoding target pixel Px' (step S20).

In this way, the pixel values in the respective blocks in one frame are successively decoded. Since the first pixel in one frame has no decoded pixel for reference, its decoding process is carried out with a prediction pixel value of 0.

In the inverse blocking unit 30, the decoded image signals Ds are combined so as to correspond to a single frame screen to output a reproduced image signal Rs of a scanning line structure.

As described above, according to the fifth embodiment of the invention, when a pixel value of an undecoded pixel is referred to, since a pixel value of a coded pixel in its vicinity is referred to, the adaptive pixel-by-pixel decoding process and the block-by-block decoding process can be performed without degrading correlation of pixel values between the undecoded pixel and the decoding target pixel. Thereby, it is possible to accurately decode a coded image signal Cs which has been processed in a coding method in which influence of transmission error can be converged block by block and the coding efficiency can be improved as compared with the simple block-by-block coding process.

While in the fifth embodiment two auxiliary memories 6a and 6b of different times for holding the output M from the main memory 4 are provided, only one auxiliary memory for temporarily holding the output from the main memory 4 may be provided, and the time for holding the pixel value output from the main memory 4 may be changed by the decoded/undecoded decision unit 20 according to the distance between the undecoded pixel and the decoding target pixel.

Further, while in the fifth embodiment only the prediction pixel value of the decoding target pixel Px' is referred to in the decoding process for the image signal, the decoding process may be performed on the basis of, not only the prediction pixel value of the decoding target pixel Px', but also the prediction probability that shows the accuracy of the prediction pixel value.

In this case, when the image signal being a target of the decoding process is a binary shape signal, since the prediction pixel value is either "0" or "1", only the prediction probability may be referred to, with the prediction pixel value being fixed to either "0" or "1".

Hereinafter, as a sixth embodiment of the invention, an image decoding apparatus for performing a decoding process of a binary shape signal with reference to only a prediction probability in place of the prediction pixel value will be described, and as a seventh embodiment of the invention, an image decoding apparatus for performing a decoding process of a multivalued image signal with reference to both the prediction pixel value and a prediction probability will be described.

Embodiment 6

FIG. 10 is a block diagram illustrating a construction of an image decoding apparatus according to a sixth embodiment of the present invention. In the figure, the same reference numerals as those shown in FIG. 8 designate the same parts as in the image decoding apparatus 105 according to the fifth embodiment.

The image decoding apparatus 106 according to the sixth embodiment includes a prediction probability generator 22 in place of the prediction value generator 14 in the image decoding apparatus 105 according to the fifth embodiment, and performs a decoding process for a binary shape signal whose pixel value is either "0" or "1".

The prediction probability generator 22 has a construction in which as a prediction probability Sk, a probability of a pixel value of a decoding target pixel Px' matching with its prediction pixel value is obtained from pixel values of reference pixels P0'~P9' for the decoding target pixel Px', and then the prediction probability Sk for the decoding target pixel Px' is output toward the decoder 26b.

The decoder 26b has a construction to perform a decoding process for a coded image signal Cs which has been coded by the image coding apparatus 102 according to the second embodiment.

A description is given of the function and effect.

Here, the operation identical to that of the image coding apparatus according to the first embodiment is not described.

Also in the binary shape signal decoding process by the image decoding apparatus 105 thus constructed, with respect to undecoded pixels among the reference pixels P0'~P9' for the decoding target pixel Px', their pixel values are generated from the pixel values of the decoded pixels as in the image decoding apparatus 105 according to the fifth embodiment, and the pixel values corresponding to all the reference pixels P0'~P9' are stored in the prediction probability generator 22.

In the prediction probability generator 22, on the basis of the pixel values of the reference pixels P0'~P9', a prediction probability Sk for the decoding target pixel Px' is obtained. This prediction probability Sk is output from the prediction probability generator 22 to the decoder 26b, and in the decoder 26b, a difference value between the pixel value of the decoding target pixel Px' and a previously set prediction pixel value is subjected to a decoding process according to the prediction probability Sk.

As described above, according to the sixth embodiment of the invention, in the image decoding apparatus 106 for decoding a coded image signal obtained by coding a binary image signal, it is possible to realize a decoding process corresponding to a coding process capable of coding a coding target pixel adjacent to the block boundary, for which generation of a prediction value is difficult, while suppressing degradation in coding efficiency.

Embodiment 7

FIG. 11 is a block diagram illustrating a construction of an image decoding apparatus according to a seventh embodiment of the invention. In the figure, the same reference numerals as those shown in FIG. 8 designate the same parts as in the image coding apparatus 105 according to the fifth embodiment.

The image decoding apparatus 107 according to the seventh embodiment is for performing a coding process for a multivalued image signal as described above, and has a construction to perform a decoding process for a coded image signal Cs which has been coded by the image coding apparatus 103 according to the third embodiment.

More specifically, a prediction probability generation unit 170 in the image decoding apparatus 107 includes a prediction probability generator 22 in addition to the prediction value generator 14 in the image coding apparatus 105 according to the fifth embodiment.

Like the prediction value generator 14, the prediction probability generator 22 has a construction to receive outputs Sout from the selector switch 12, to successively store pixel values of reference pixels P0'~P9' for a decoding target pixel Px', and to output, on the basis of these pixel values, a prediction probability Sk that shows the accuracy of a prediction pixel value Sp which is predicted on the basis of the reference pixels. P0'~P9' in the prediction value generator 14.

The decoder 26c performs a decoding process corresponding to the coding process by the encoder 16c according to the third embodiment, and the decoder 26c has a construction in which the pixel value of the decoding target pixel Px' is decoded on the basis of the prediction pixel signal Sp from the prediction value generator 14 and the prediction probability Sk from the prediction probability generator 22.

A description is given of the function and effect.

Here, the operation identical to that of the image coding apparatus according to the fifth embodiment is not described.

Also in the multivalued image signal decoding process by the image decoding apparatus 107 thus constructed, with respect to undecoded pixels among the reference pixels P0'~P9' for the decoding target pixel Px', their pixel values are generated from the pixel values of the decoded pixels as in the image decoding apparatus 105 according to the fifth embodiment, and the pixel values corresponding to all the reference pixels P0'~P9' are stored in the prediction probability generator 22 and the prediction value generator 14.

In the prediction value generator 14, a prediction pixel value of the decoding target pixel Px' is obtained from the reference pixels P0'~P9' as in the fifth embodiment. Further, in the prediction probability generator 22, a prediction probability for the decoding target pixel Px' is obtained on the basis of the pixel values of the reference pixels P0'~P9'.

When the prediction pixel value Sp and the prediction probability Sk are output to the decoder 26c, the decoder 26c performs a decoding process according to the prediction probability Sk for a value obtained by adding the pixel value of the decoding target pixel Px' and the prediction pixel value from the prediction value generator 14. The pixel value of the decoding target pixel Px' so reproduced is stored in the main memory 4.

As described above, according to the seventh embodiment of the invention, in the image decoding apparatus 107 for decoding a coded image signal obtained by coding a multivalued image signal, it is possible to realize a decoding process corresponding to a coding process capable of coding a coding target pixel adjacent to the block boundary, for which generation of a prediction value is difficult, while suppressing degradation in coding efficiency.

Although in the fifth, sixth and seventh embodiments, described are image decoding apparatuses for decoding coded image signals that have been reversibly coded by the image coding apparatuses 101, 102 and 103 according to the first, second and third embodiments, respectively, by constructing the decoder 26a so as to perform a decoding process corresponding to non-reversible coding, the image decoding apparatuses 105, 106 and 107 according to the fifth, sixth and seventh embodiments can correspond to the image coding apparatuses 104, 104a and 104b according to the fourth embodiment, and the first and second modifications thereof, respectively.

Further, by recording a coding of decoding program for implementing the construction of the coding apparatus or decoding apparatus according to any of the aforementioned embodiments on a data recording medium such as a floppy disk, the process described in any of the embodiments can be executed easily in individual computer systems.

FIG. 12(a) is a diagram for explaining a case where a coding or decoding process according to any of the aforementioned embodiments is executed in a computer system using a floppy disk in which the coding or decoding program is stored.

FIG. 12(b) shows a front view of a floppy disk, its cross section, and a floppy disk, and FIG. 12(a) shows an example of a physical format of the floppy disk as a recording medium body. The floppy disk FD is contained in a case F, plural tracks Tr are concentrically formed on the surface of the disk from the outer circumference toward the inner circumference, and each track is divided into 16 sectors Se in the angular direction. Therefore, in the floppy disk containing the above-mentioned program, in a region allocated on the floppy disk FD, data as the program is recorded.

FIG. 12(c) shows a structure for performing recording/reproduction of the program on the floppy disk FD. When the program is recorded on the floppy disk FD, data as the program from a computer system Csis is written via a floppy disk drive. When the above-mentioned coding or decoding apparatus is constructed in the computer system by the program in the floppy disk, the program is read from the floppy disk by the floppy disk drive and transmitted to the computer system.

Although in the above description a floppy disk is employed as a data recording medium, an optical disk may be employed. Further, the recording medium is not limited to these disks, and anything may be employed as long as a program, for example, an IC card or a ROM cassette, can be recorded therein.

In the second and third embodiments and the first and second modifications of the fourth embodiment, there is described an example in which the coding method is changed according to the prediction probability, and in the fifth and sixth embodiments, there is described an example in which the decoding method is changed according to the prediction probability, but code word (coding table) can be changed according to the prediction probability. Especially when coding is performed with arithmetic code, by updating a probability table corresponding to the arithmetic code according to the prediction probability, the image coding apparatuses according to the second and third embodiments and the first and second modifications of the fourth embodiment, and the image decoding apparatuses according to the fifth and sixth embodiments can be realized by simple structures, and in this case, the effect on practical use is considerable.

In the present invention, when a prediction pixel value of a coding target pixel is predicted with reference to pixel values of plural peripheral pixels located in its vicinity, for uncoded pixels among the peripheral pixels, pseudo pixel values are generated using pixel values of coded pixels among the peripheral pixels, but according to the position of the coding target pixel in the block, as a group of peripheral pixels to be referred to when generating its prediction pixel value, peripheral pixels in different arrangement in the vicinity of the coding target pixel may be employed.

For example, in a specific description with reference to FIG. 14, when the coding target pixel Px is positioned at the boundary of the block, only the peripheral pixels P0, P1, P3, P4, P5, P8, and P9 are used as reference pixels, and when the coding target pixel Px is not positioned at the boundary of the block, all of the peripheral pixels P0, P1, P2, P3, P4, P5, P6, P7, P8, and P9 are used as reference pixels. When the coding target pixel Px is coded, the code word is switched between code word constructed by only the peripheral pixels. P0, P1, P3, P4, P5, P8, and P9 and code word constructed by all of the peripheral pixels P0, P1, P2, P3, P4, P5, P6, P7, P8, and P9.

In other words, the encoder is constructed so that it has plural code words corresponding to positions of the coding target pixel Px in the block, and the code word is changed according to the position of the coding target pixel Px.

Even in such a construction, it can be easily known from the embodiments of the present invention that the same effects as provided by the image coding apparatuses are obtained.

Further, the decoder is also constructed so that it has plural code words corresponding to positions of the decoding target pixel Px' in the block shown in FIG. 17, and the code word is changed according to the position of the decoding target pixel Px', whereby the same effects as provided by the image decoding apparatuses of the aforementioned embodiments are obtained.

APPLICABILITY IN INDUSTRY

As described above, the image coding apparatuses, image coding methods, image decoding apparatuses, image decoding methods, and data recording media according to the present invention can improve coding efficiency in a compression process for image signals, and are very valuable for realizing an image coding process and an image decoding process in a system performing transmission or storage of image signals and, especially, are suitable for compression and decompression processes of moving pictures based on standards such as MPEG4.

What is claimed is:

1. An image coding apparatus for successively coding, block by block, each block comprising a prescribed number of pixels, pixel values constituting an image signal on the basis of pixel values of plural peripheral pixels positioned in the vicinity of a coding target pixel, comprising:

blocking means for blocking an image signal comprising plural pixels into blocks, each block having a square form and comprising N×N pixels;

pixel value replacing means for replacing a pixel value of an uncoded pixel among plural peripheral pixels positioned in the vicinity of a coding target pixel, the peripheral pixels including at least three lines of pixels and the target pixel being in the third line, with a pseudo pixel value obtained from a pixel value of a coded pixel among the plural peripheral pixels;

wherein the pixel value replacing means employs, as the pseudo pixel value of the uncoded pixel, a pixel value of a coded pixel that is positioned at the shortest distance from the uncoded pixel and on the same horizontal scanning line among said three lines of pixels;

coding means for (a) performing, block by block, a coding process in which the respective pixels of a coding target block are coded using pixel values of at least one coded pixel positioned in each of a previously coded block and the coding target block, and a pseudo pixel value of an uncoded pixel, and wherein the respective pixels are coded on the basis of
  i) the pixel value of a coded pixel positioned in a previously coded block for the peripheral pixel positioned in a previously coded block;
  ii) the pixel value of a coded pixel positioned in the coding target block for the peripheral pixel positioned in the coding target block; and
  iii) a pseudo pixel value of the uncoded pixel for the peripheral pixels positioned in an uncoded block, and (b) outputting a coded image signal corresponding to each block.

2. An image coding apparatus according to claim 1, wherein in said at least three lines of pixels the first line has at least three pixels, the second line has at least five pixels, and the third line has at least two pixels.

* * * * *

UNITED STATES PATENT AND TRADEMARK OFFICE
CERTIFICATE OF CORRECTION

PATENT NO. : 6,487,315 B2
DATED : November 26, 2002
INVENTOR(S) : Shinya Kadono

It is certified that error appears in the above-identified patent and that said Letters Patent is hereby corrected as shown below:

<u>Title page,</u>
Item [63], please delete and insert the following:

-- Continuation of application No. 09/651,120, filed on Aug. 30, 2000, now Pat. No. 6,487,314, which is a continuation of application No. 09/077,378, filed Jul. 20, 1998, now Pat. No. 6,173,078B1 which is a 371 of PCT/JP97/03917 on Oct. 29, 1997. --

Signed and Sealed this

First Day of July, 2003

JAMES E. ROGAN
*Director of the United States Patent and Trademark Office*